United States Patent [19]
Endo

[11] Patent Number: 5,710,669
[45] Date of Patent: Jan. 20, 1998

[54] WIDE-ANGLE ZOOM LENS

[75] Inventor: Hiroshi Endo, Kanagawa-ken, Japan

[73] Assignee: Canon Kabushiki Kaisha, Tokyo, Japan

[21] Appl. No.: 404,330

[22] Filed: Mar. 15, 1995

[30] Foreign Application Priority Data

Mar. 17, 1994 [JP] Japan .................................. 6-047037
Sep. 19, 1994 [JP] Japan .................................. 6-251345

[51] Int. Cl.⁶ ...................................................... G02B 15/14
[52] U.S. Cl. ............................................ 359/686; 359/708
[58] Field of Search ................................... 359/686, 683, 359/708

[56] References Cited

U.S. PATENT DOCUMENTS 5,329,401  7/1994  Sato ............................................ 359/686

FOREIGN PATENT DOCUMENTS 49-23912   6/1974   Japan .
57-163213  10/1982  Japan .
02201310   8/1990   Japan .
2-201310   8/1990   Japan ....................................... 359/686
02296208   12/1990  Japan .
04235514   8/1992   Japan .
04235515   8/1992   Japan .

Primary Examiner—David Nelms
Assistant Examiner—Dawn-Marie Bey
Attorney, Agent, or Firm—Fitzpatrick, Cella, Harper & Scinto

[57] ABSTRACT

A zoom lens is disclosed comprising, from front to rear, a first lens unit of negative refractive power, a second lens unit of positive refractive power, a third lens unit of negative refractive power and a fourth lens unit of positive refractive power, zooming being performed by varying the separations between these lens units, and the zoom lens satisfying the following conditions:

$$-0.3 < M1/M2 < 1.0$$

$$6.0 < TLW/fW < 10.0$$

where fW is the shortest focal length of the entire system, M1 and M2 are the total zooming movements of the first and second lens units, respectively, and TLW is the optical total length for the wide-angle end.

6 Claims, 17 Drawing Sheets

FIG.3(A)(1) 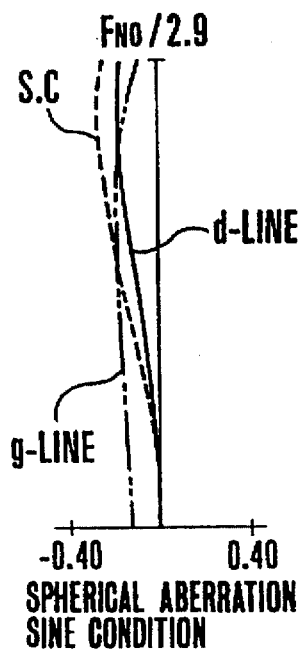
FIG.3(A)(2) 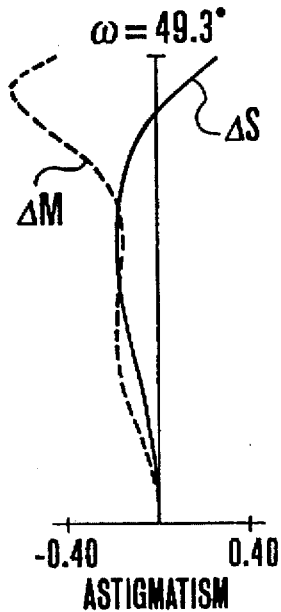
FIG.3(A)(3) 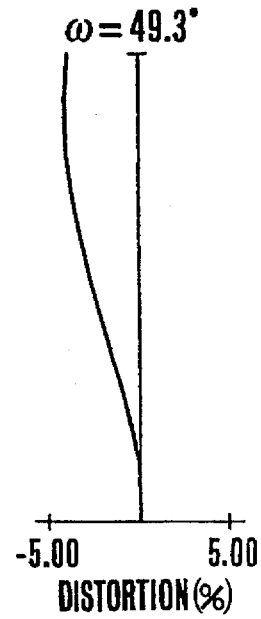
FIG.3(B)(1) 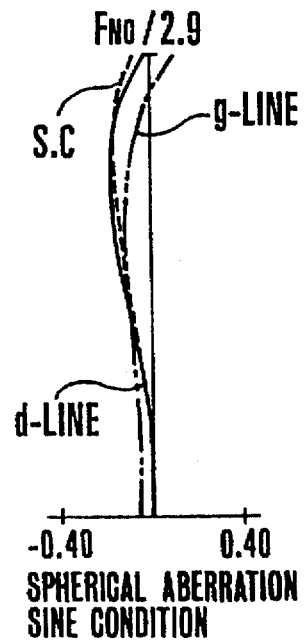
FIG.3(B)(2) 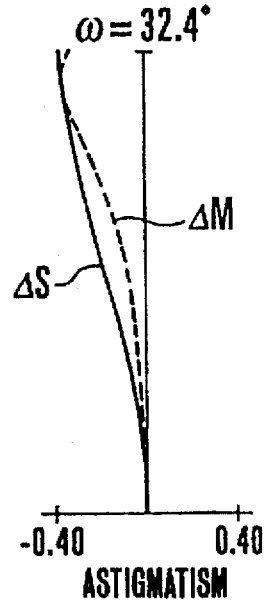
FIG.3(B)(3) 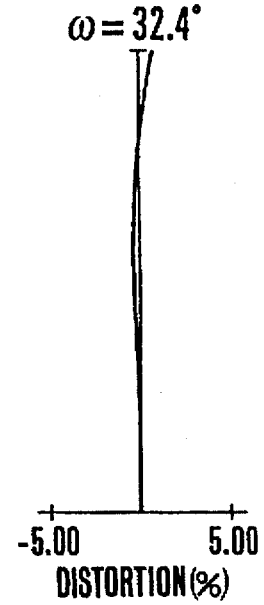

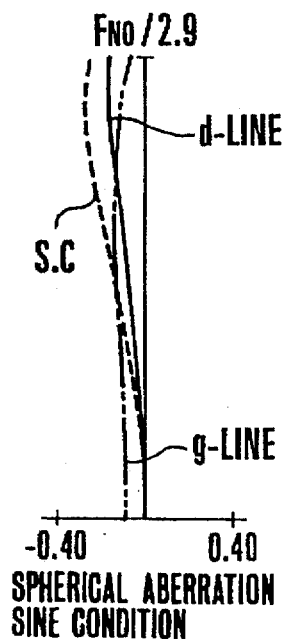
FIG.4(A)(1)
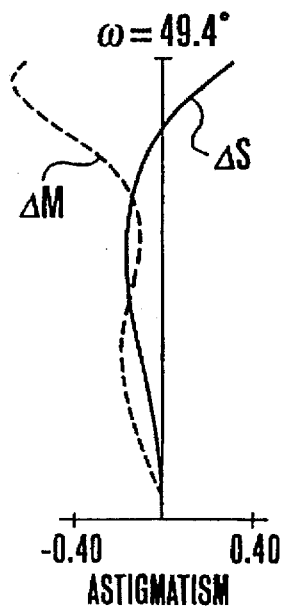
FIG.4(A)(2)
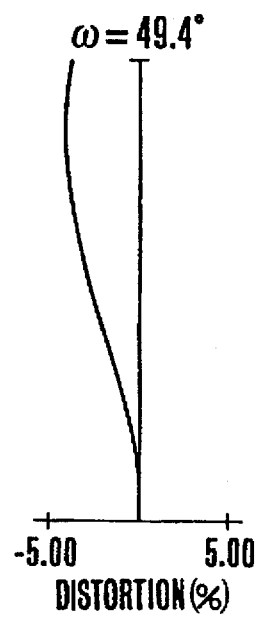
FIG.4(A)(3)
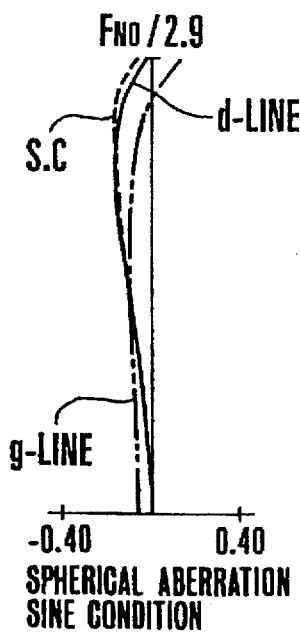
FIG.4(B)(1)
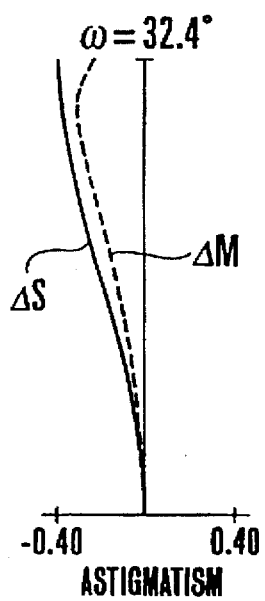
FIG.4(B)(2)
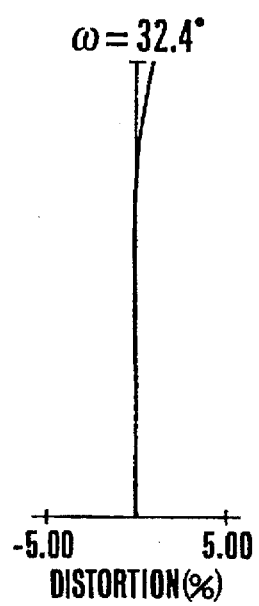
FIG.4(B)(3)

FIG.14(A)(1)
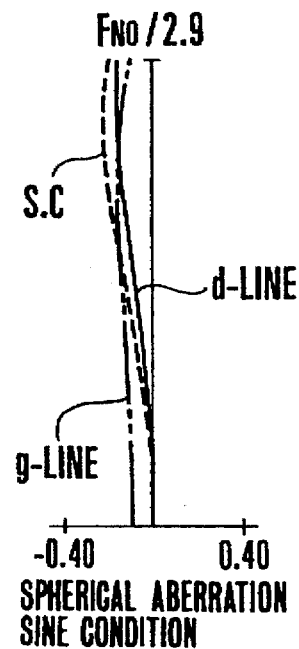
SPHERICAL ABERRATION
SINE CONDITION
FIG.14(A)(2)
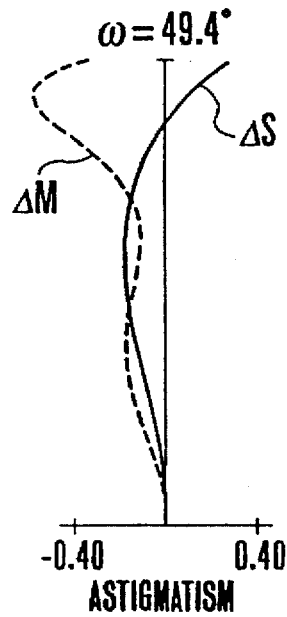
ASTIGMATISM
FIG.14(A)(3)
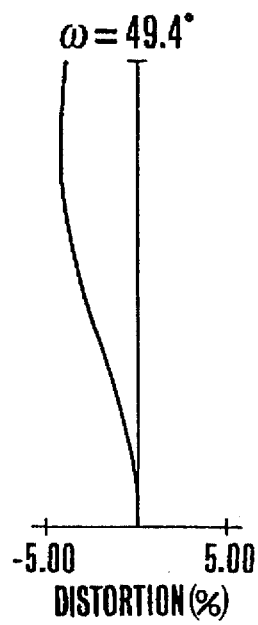
DISTORTION(%)
FIG.14(B)(1)
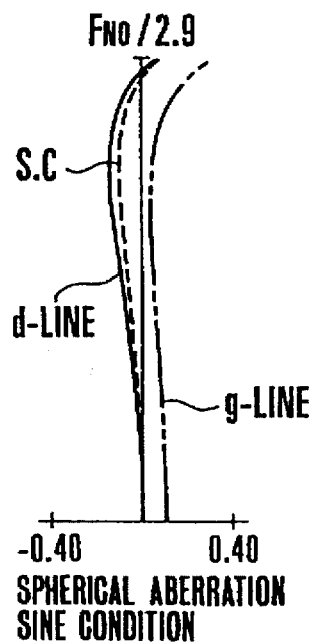
SPHERICAL ABERRATION
SINE CONDITION
FIG.14(B)(2)
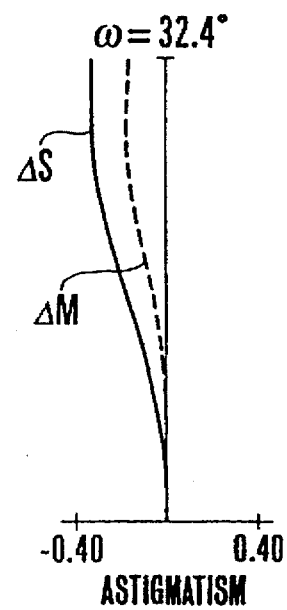
ASTIGMATISM
FIG.14(B)(3)
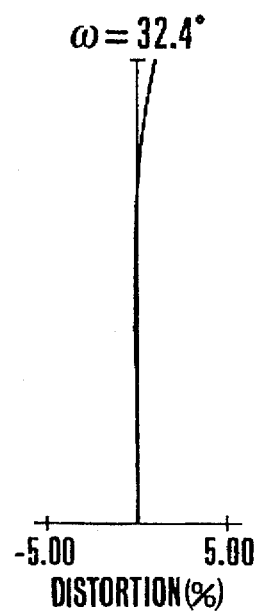
DISTORTION(%)

FIG.15(A)(1) 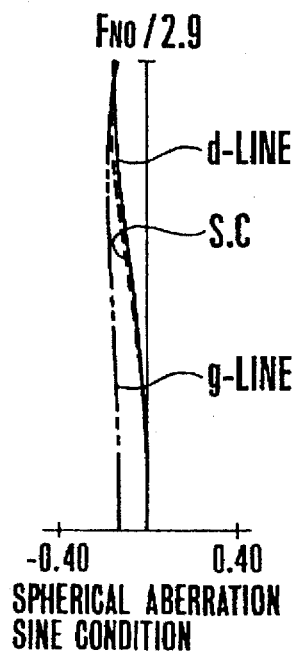
FIG.15(A)(2) 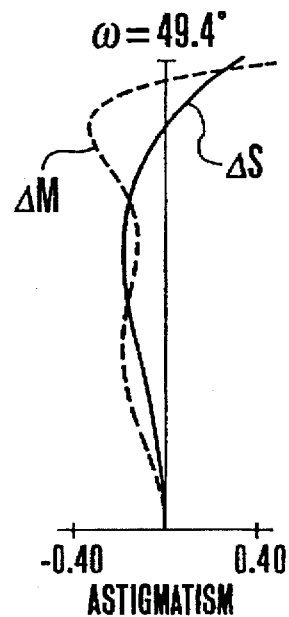
FIG.15(A)(3) 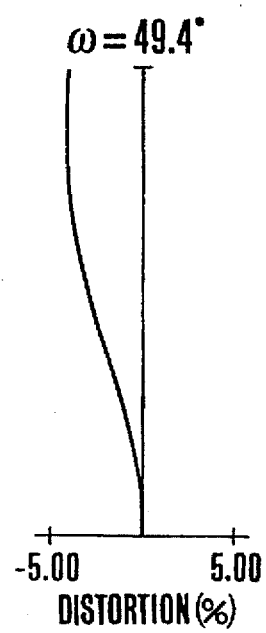
FIG.15(B)(1) 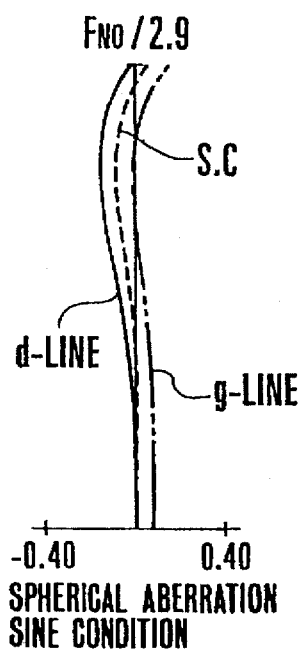
FIG.15(B)(2) 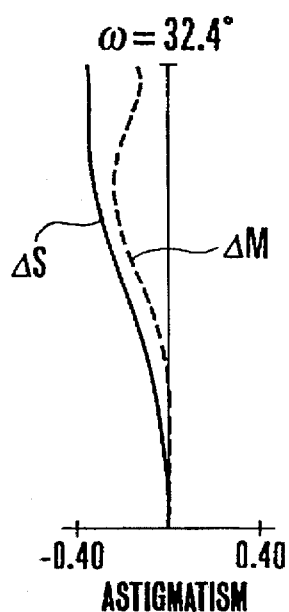
FIG.15(B)(3) 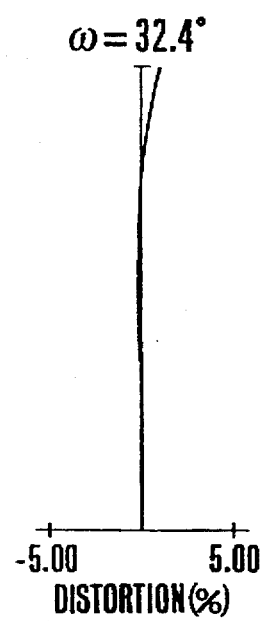

FIG.16(A)(1)
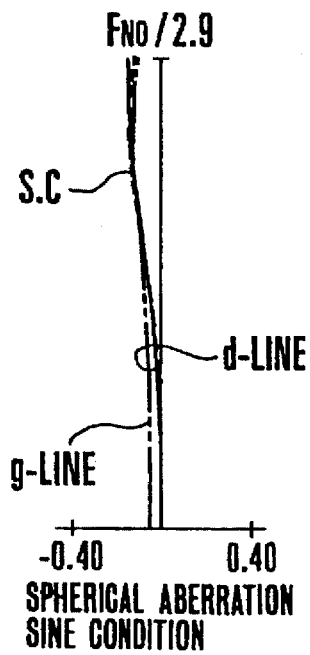
SPHERICAL ABERRATION
SINE CONDITION
FIG.16(A)(2)
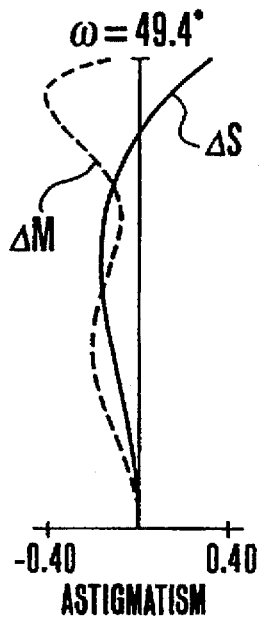
ASTIGMATISM
FIG.16(A)(3)
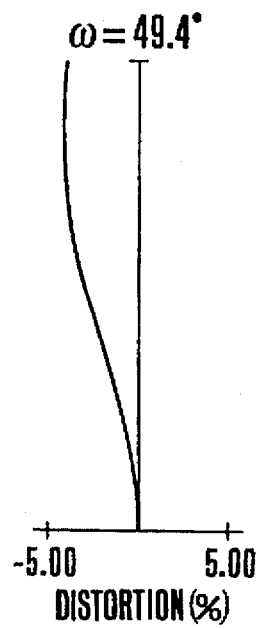
DISTORTION (%)
FIG.16(B)(1)
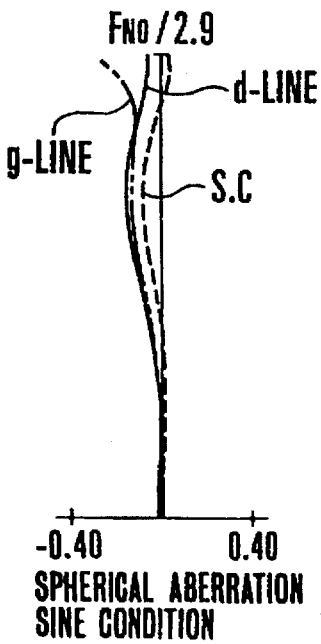
SPHERICAL ABERRATION
SINE CONDITION
FIG.16(B)(2)
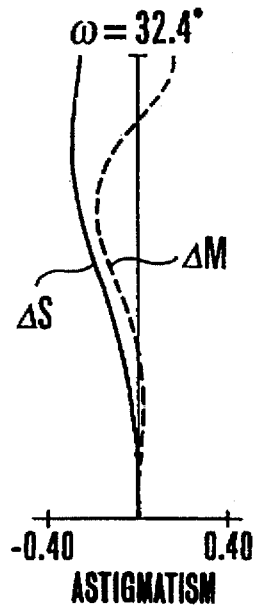
ASTIGMATISM
FIG.16(B)(3)
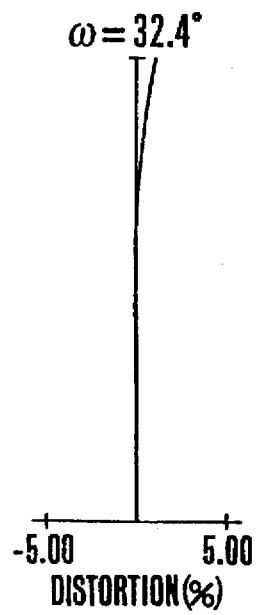
DISTORTION (%)

FIG.17(A)(1) 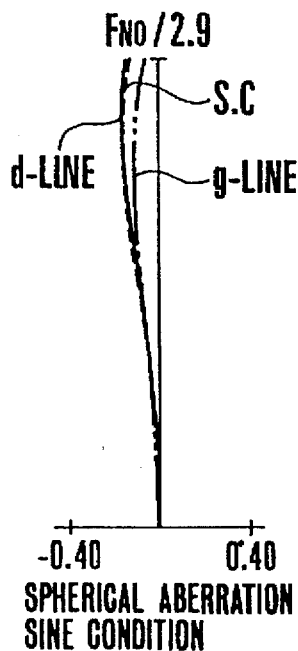
FIG.17(A)(2) 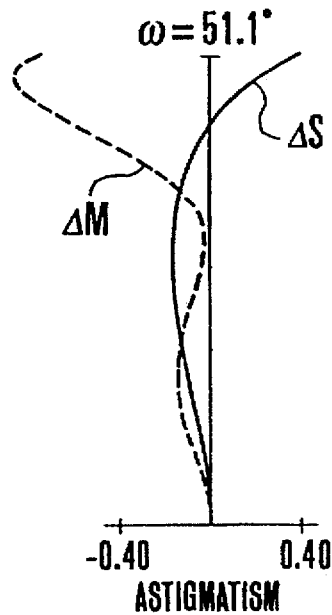
FIG.17(A)(3) 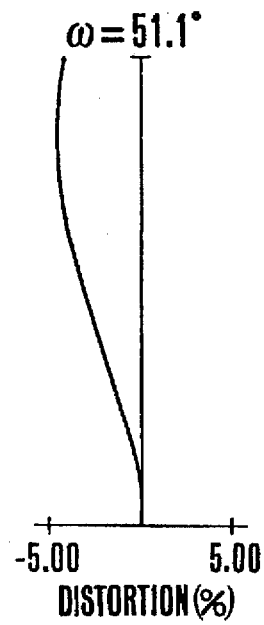
FIG.17(B)(1) 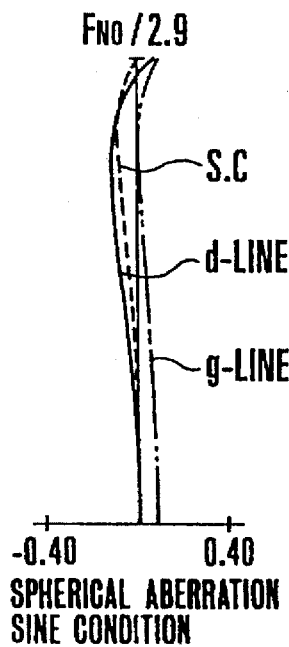
FIG.17(B)(2) 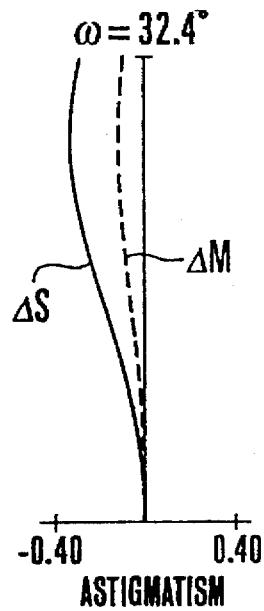
FIG.17(B)(3) 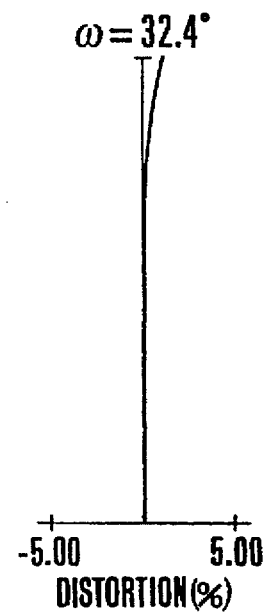

FIG.18(A)(1)
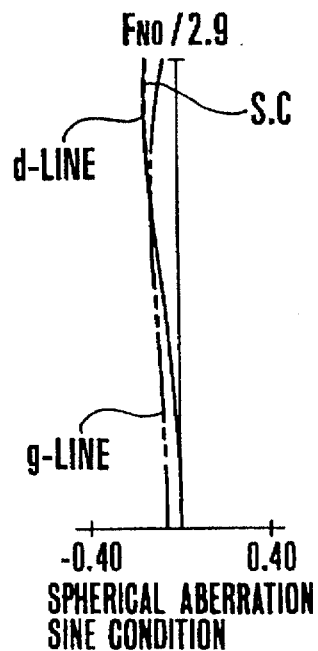
FIG.18(A)(2)
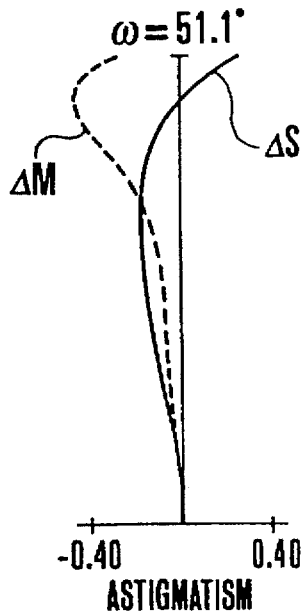
FIG.18(A)(3)
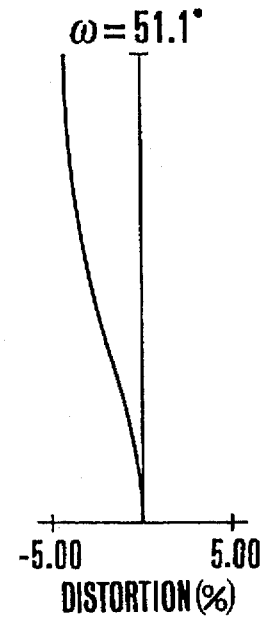
FIG.18(B)(1)
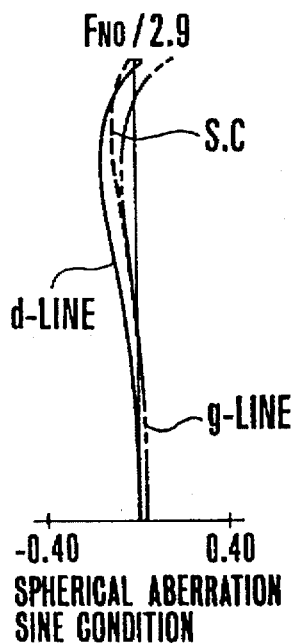
FIG.18(B)(2)
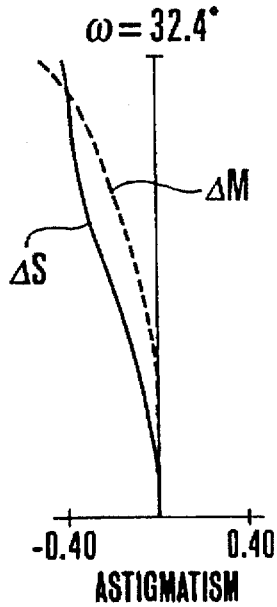
FIG.18(B)(3)
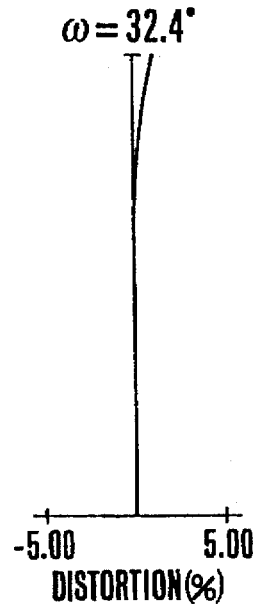

FIG.19(A)(1)
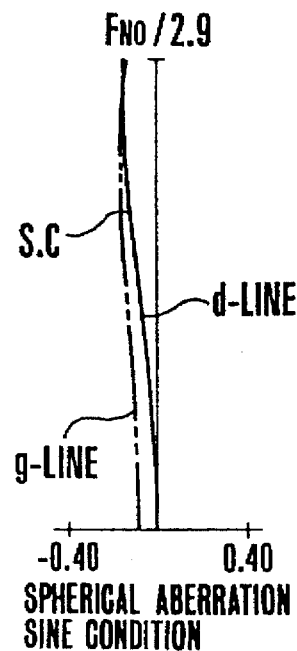
FIG.19(A)(2)
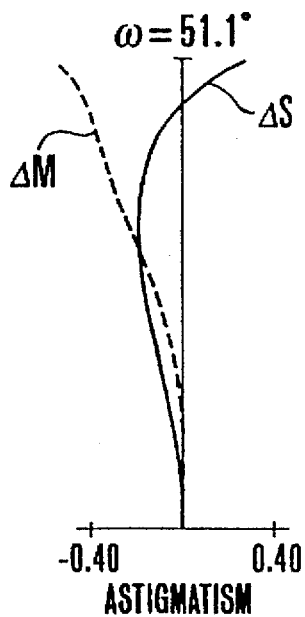
FIG.19(A)(3)
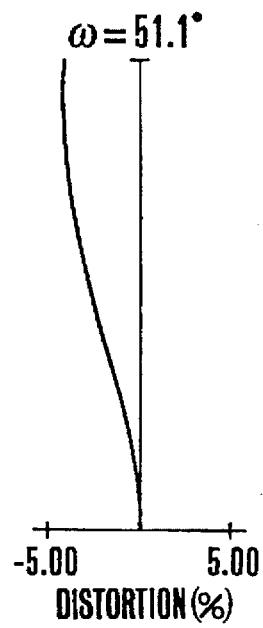
FIG.19(B)(1)
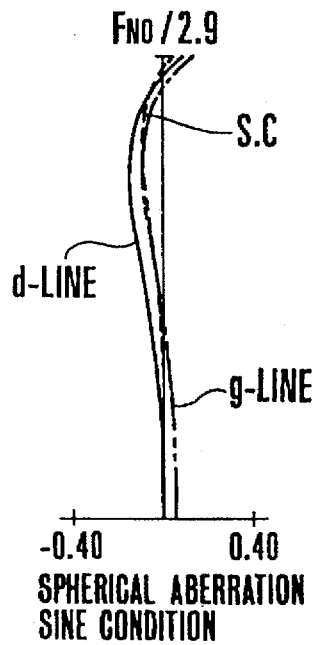
FIG.19(B)(2)
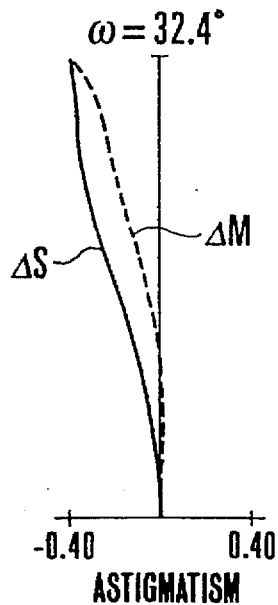
FIG.19(B)(3)
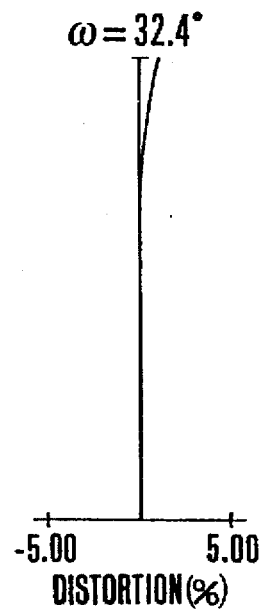

FIG.20(A)(1)
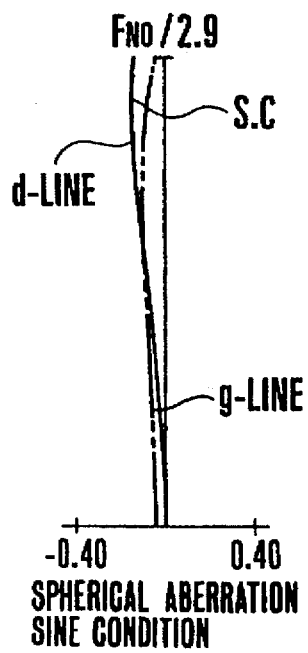
FIG.20(A)(2)
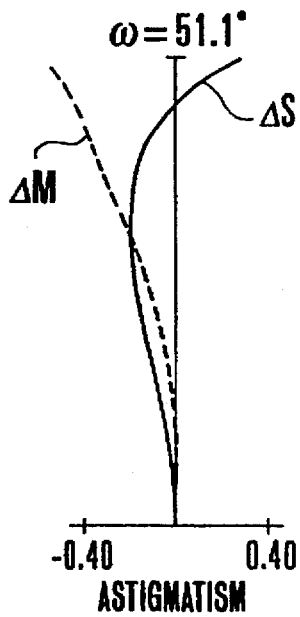
FIG.20(A)(3)
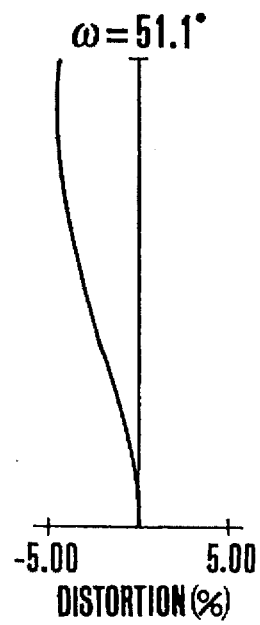
FIG.20(B)(1)
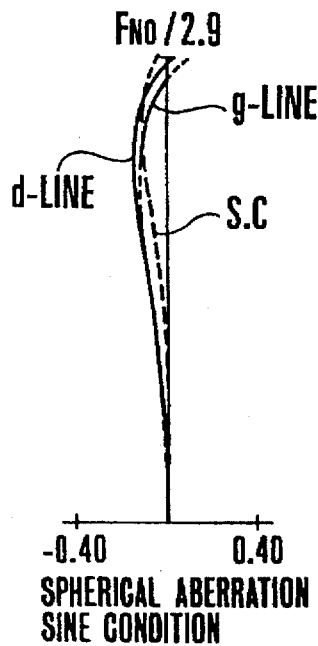
FIG.20(B)(2)
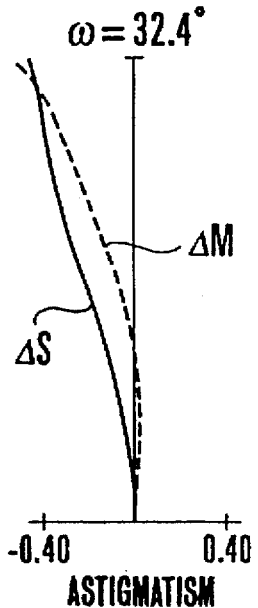
FIG.20(B)(3)
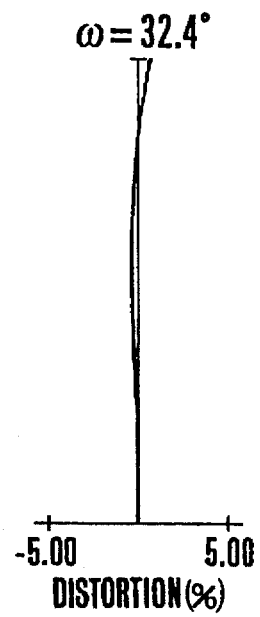

FIG.21(A)(1)
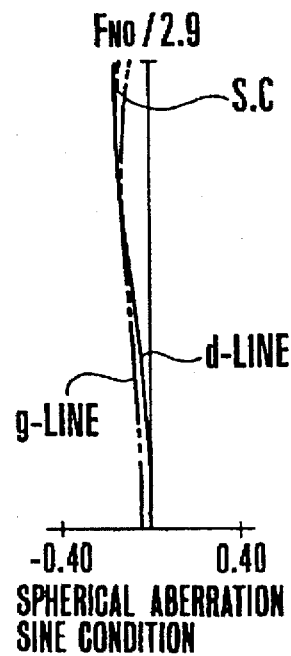
FIG.21(A)(2)
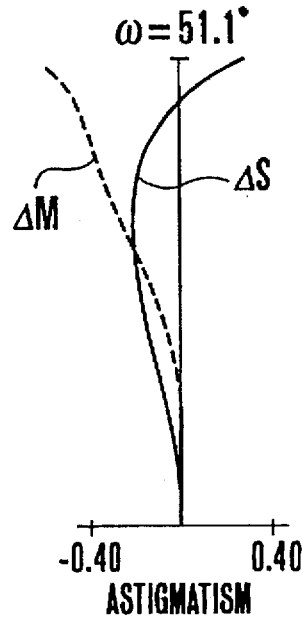
FIG.21(A)(3)
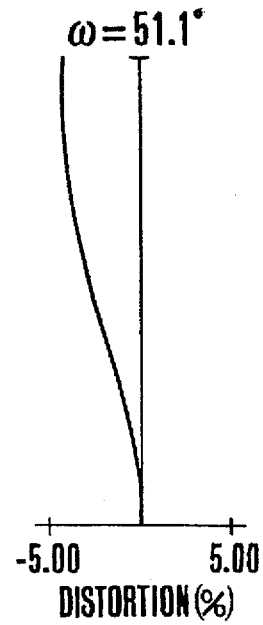
FIG.21(B)(1)
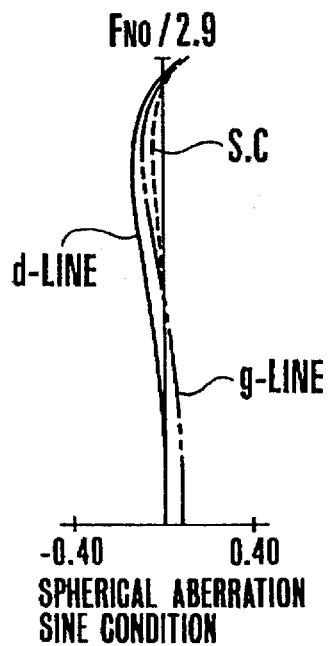
FIG.21(B)(2)
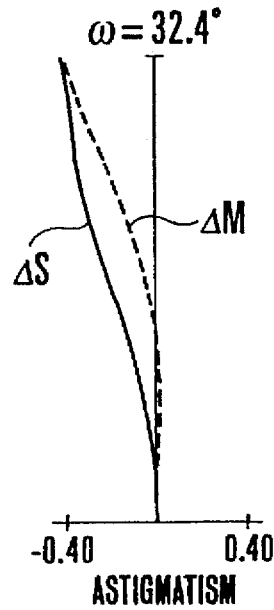
FIG.21(B)(3)
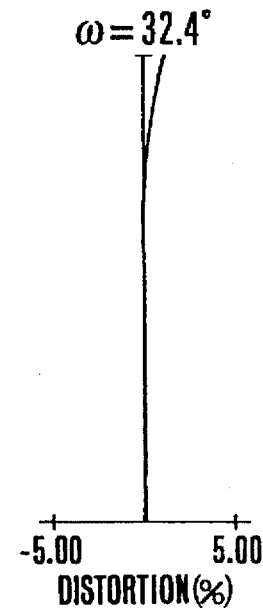

FIG.22(A)(1)
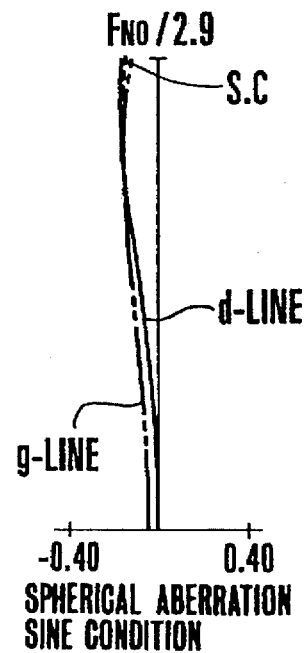
FIG.22(A)(2)
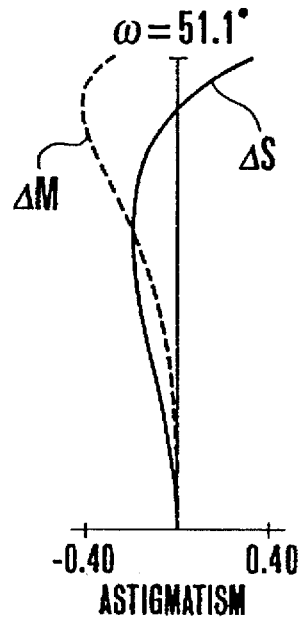
FIG.22(A)(3)
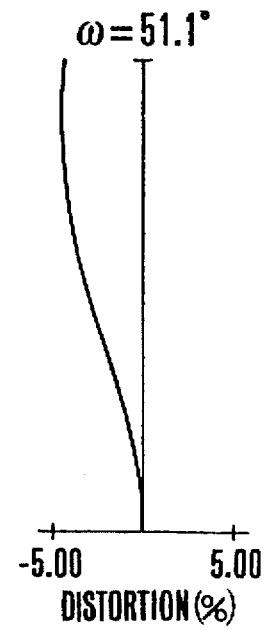
FIG.22(B)(1)
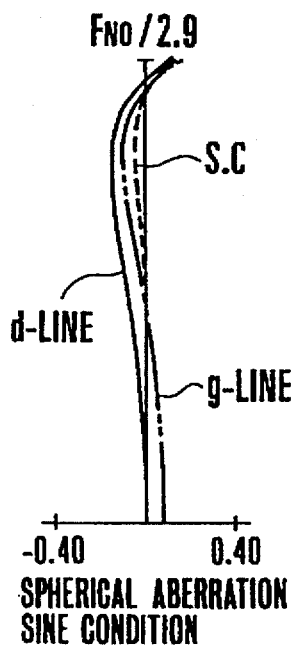
FIG.22(B)(2)
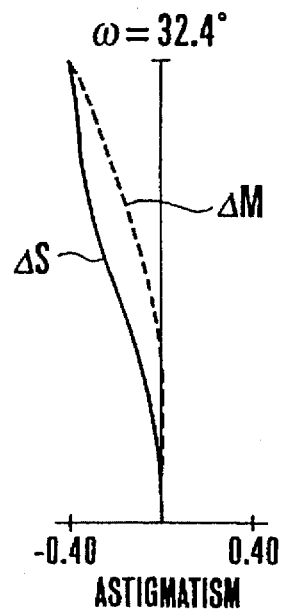
FIG.22(B)(3)
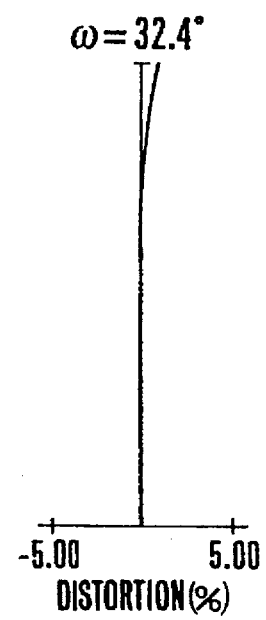

WIDE-ANGLE ZOOM LENS

BACKGROUND OF THE INVENTION

1. Field of the Invention

This invention relates to zoom lenses suited to photographic cameras for 35 mm film, video cameras of the electronic record type or still video cameras and, more particularly, to zoom lenses having a lens unit of negative refractive power in the lead and comprising four lens units in total, wherein these four lens units are appropriately designed to improve the compact from of the entire lens system. Still more particularly, it relates to zoom lenses of the negative lead type having a range of 2 and an F-number of 2.9 with a total angular field of 100° for the wide-angle end.

2. Description of the Related Art

The type in which a lens unit of negative refractive power is in the lead, or the so-called negative lead type, has found its use in many wide-angle zoom lenses of a wider angular field than 90°, because the angular field can be increased relatively easily.

For the zoom lens to have as wide an angular field coverage as such, previous proposals have been made in, for example, Japanese Laid-Open Patent Applications Nos. Hei 2-201310, Hei 2-296208, Hei 4-235514 and Hei 4-235515. These zoom lenses each comprise four lens units of minus-plus-minus-plus power arrangement in this order from the object side.

Besides these, there are other previous proposals in Japanese Patent Publication No. Sho 49-23912 and Japanese Laid-Open Patent Application No. Sho 57-163213, where the wide-angle zoom lens comprises, from front to rear, a first lens unit of negative refractive power, a second lens unit of positive refractive power, a third lens unit of negative refractive power and a fourth lens unit of positive refractive power, whereby, when zooming from the wide-angle end to the telephoto end, the first lens unit is made to move axially toward the image side, the second and fourth lens units are made to move axially toward the object side, and the third lens unit either remains stationary, or is made movable.

In recent years, for the single-lens reflex cameras or video cameras, zoom lenses of widened angular field are demanded.

In general, with the use of the negative lead type in the zoom lens, when increasing the total angular field coverage for the wide-angle end to, for example, 100° or so with the preservation of the predetermined back focal distance and when maintaining good stability of optical performance throughout the entire zooming range at a zoom ratio of about 2 with the limitation of the F-number for the wide-angle end to 3 or below, there is a need to make a proper selection of a refractive power arrangement over all the lens units. If the right power arrangement is not used, or the construction and arrangement of the constituent lenses are not suitable, large variation of aberrations with zooming will result. So, it becomes difficult to obtain high optical performance over the entire zooming lens, no matter how many more lens elements may be used.

SUMMARY OF THE INVENTION

The present invention employs the negative lead type in the zoom lens comprising four lens units in total and sets forth proper rules of design for the refractive powers of all the lens units and for the construction and arrangement of their constituent lenses. It is, therefore, an object of the invention to provide a zoom lens having an angular field of 100° for the wide-angle end, a range of 2 and an F-number of 2.9 with the preservation of the predetermined back focal distance, while still maintaining high optical performance over the entire zooming range.

BRIEF DESCRIPTION OF THE DRAWINGS

FIGS. 3(A)(1)–3(A)(3) and 3(B)(1)–3(B)(3) are graphic representations of the aberrations of the numerical example 1 of the zoom lens of the invention.

FIGS. 4(A)(1)–4(A)(3) and 4(B)(1)–4(B)(3) are graphic representations of the aberrations of the numerical example 2 of the zoom lens of the invention.

FIGS. 14(A)(1)–14(A)(3) and 14(8)(1)–14(B)(3) are graphic representations of the aberrations of the numerical example 3 of the zoom lens of the invention.

FIGS. 15(A)(1)–15(A)(3) and 15(B)(1)–15(B)(3) are graphic representations of the aberrations of the numerical example 4 of the zoom lens of the invention.

FIGS. 16(A)(1)–16(A)(3) and 16(B)(1)–16(B)(3) are graphic representations of the aberrations of the numerical example 5 of the zoom lens of the invention.

FIGS. 17(A)(1)–17(A)(3) and 17(B)(1)–17(B)(3) are graphic representations of the aberrations of the numerical example 6 of the zoom lens of the invention.

FIGS. 18(A)(1)–18(A)(3) and 18(B)(1)–18(B)(3) are graphic representations of the aberrations of the numerical example 7 of the zoom lens of the invention.

FIGS. 19(A)(1)–19(A)(3) and 19(B)(1)–19(B)(3) are graphic representations of the aberrations of the numerical example 8 of the zoom lens of the invention.

FIGS. 20(A)(1)–20(A)(3) and 20(B)(1)–20(B)(3) are graphic representations of the aberrations of the numerical example 9 of the zoom lens of the invention.

FIGS. 21(A)(1)–21(A)(3) and 21(B)(1)–21(B)(3) are graphic representations of the aberrations of the numerical example 10 of the zoom lens of the invention.

FIGS. 22(A)(1)–22(A)(3) and 22(B)(1)–22(B)(3) are graphic representations of the aberrations of the numerical example 11 of the zoom lens of the invention.

In the aberration curves, d stands for the spectral d-line, g for the spectral g-line, S.C. for the sine condition, ΔS for the sagittal image focus, and ΔM for the meridional image focus.

DETAILED DESCRIPTION OF THE PREFERRED EMBODIMENTS

Figure 1:
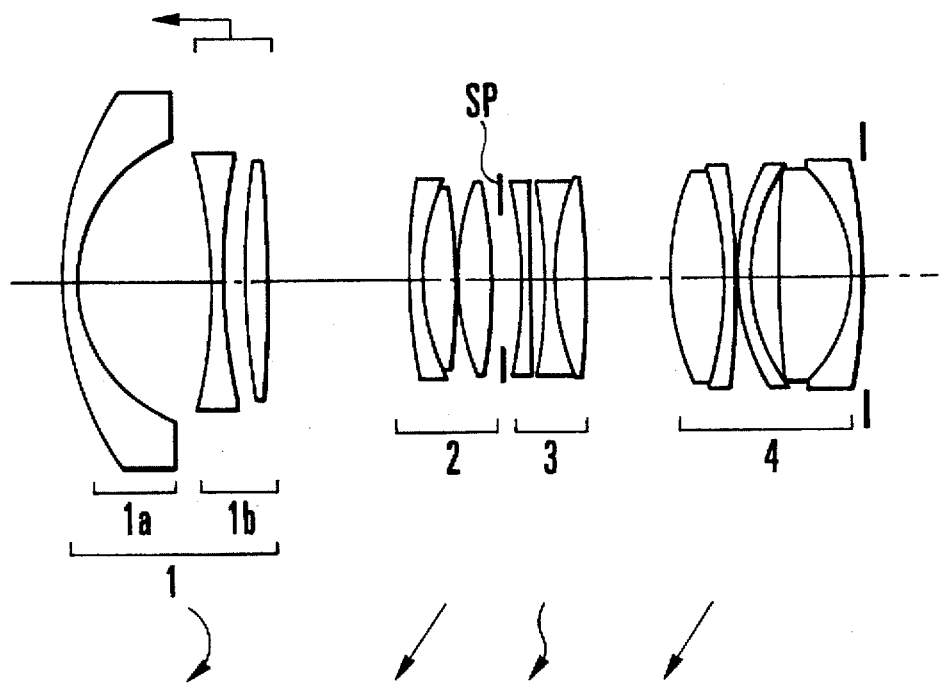
FIG. 1 is a longitudinal section view of a numerical example 1 of the zoom lens of the invention.
Figure 2:
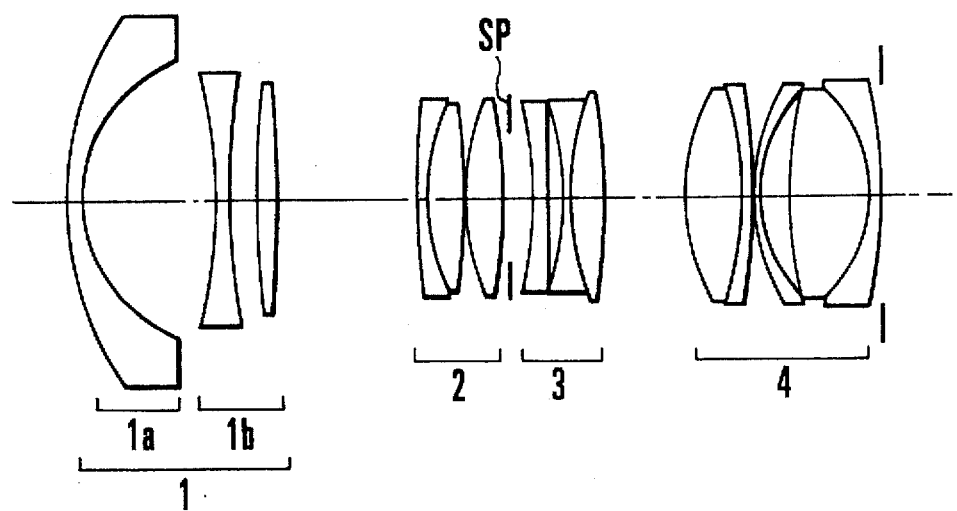
FIG. 2 is a longitudinal section view of a numerical example 2 of the zoom lens of the invention.

Referring to the lens block diagrams of FIGS. 1 and 2, in a general embodiment of the invention, a zoom lens comprises, from front to rear, a first lens unit 1 of negative refractive power, a second lens unit 2 of positive refractive power, a third lens unit 3 of negative refractive power and a fourth lens unit 4 of positive refractive power. The first lens unit 1 is divided to front and rear lens sub-units 1a and 1b. SP is a stop. The separation between any adjacent two of these lens units is made variable for zooming so that the variation of the image magnification is shared by a plurality of lens units. The focal length of the entire system is thus made to vary with high efficiency. Moreover, it is made possible to correct aberrations in a middle focal length region.

In a specific embodiment of the invention, for the first to fourth lens units, letting DiW denote the axial air separation for the wide-angle end between the i-th lens unit and the (i+1)st lens unit with an object at infinity, and DiT the axial air separation for the telephoto end between the i-th lens unit and the (i+1)st lens unit with an object at infinity (where i is an integer), the following conditions are satisfied:

$$D1T < D1W$$

$$D2W < D2T$$

$$D3T < D3W$$

In more detail, when zooming from the wide-angle end to the telephoto end, the second lens unit and the fourth lens unit are made to move in unison axially toward the object, the third lens unit to move axially toward the object in differential relation, and the first lens unit to move axially in such a way that, in a first region of from the wide-angle end to a middle focal length position, it goes toward the image side and in a second region of from the middle focal length position to the telephoto end, it comes back toward the object. Another feature is that, when the second and fourth lens units move linearly (in proportion to the variation of the focal length), the third lens unit is made to move non-linearly, thereby assuring good correction of aberrations in the middle focal length region.

The front lens sub-unit 1a of the first lens unit is made up from a negative meniscus lens convex toward the object side, and the rear lens sub-unit 1b from a negative lens of bi-concave form and a positive lens of bi-convex form. When zooming, these parts move in unison. For focusing purposes, only the rear lens sub-unit 1b is made movable relative to the other part.

The second lens unit 2 comprises a positive lens composed of a negative meniscus lens convex toward the object side and a positive lens of bi-convex form cemented together and a positive lens of bi-convex form. The third lens unit 3 comprises a negative meniscus lens convex toward the image side and a lens composed of a negative lens of bi-concave form and a positive lens of bi-convex form cemented together. The fourth lens unit 4 comprises a lens composed of a positive lens of bi-convex form and a negative meniscus lens cemented together, a negative meniscus lens concave toward the image side and a lens composed of a positive lens of bi-convex form and a negative meniscus lens cemented together. The first and last lens surfaces are made aspheric.

In addition, as it is applied to the zoom lens comprising, from front to rear, the first lens unit of negative refractive power, the second lens unit of positive refractive power, the third lens unit of negative refractive power and the fourth lens unit of positive refractive power, the separations between these lens units being varied to effect zooming, the present embodiment sets forth the following conditions:

$$-0.3 < M1/M2 < 1.0 \quad (1)$$

$$6.0 < TLW/fW < 10.0 \quad (2)$$

where fW is the shortest focal length of the entire system, M1 and M2 are the movements of the first lens unit and the second lens unit, respectively, with zooming from the wide-angle end to the telephoto end, and TLW is the optical total length for the wide-angle end.

The zoom lens of the character described above satisfies the following additional conditions:

$$0.37 < LSP/TLW < 0.47 \quad (3)$$

$$0.6 < M3/M2 < 0.8 \quad (4)$$

where LSP is the axial length for the wide-angle end from the front vertex of the first lens unit to the frontmost lens surface in the third lens unit, TLW is the optical total length for the wide-angle end, and M2 and M3 are the total zooming movements of the second lens unit and the third lens unit, respectively.

In view of these, it is desired that the first lens unit has a negative meniscus lens concave toward the image side, wherein the front surface of this negative meniscus lens is made aspheric in such a shape that the positive refracting power gets progressively stronger as the height from the optical axis increases. For reference, the first lens unit in the preferred form is made up from a negative meniscus lens concave toward the image side, a negative lens and a positive lens.

In another example of application to the zoom lens comprising, from front to rear, the first lens unit of negative refractive power, the second lens unit of positive refractive power, the third lens unit of negative refractive power and the fourth lens unit of the positive refractive power, the separations between these lens units being varied to effect zooming, the present embodiment sets forth the following conditions:

$$1.5 < f4/fW < 3 \quad (5)$$

$$0.7 < f4/fT < 1.8 \quad (6)$$

where fW is the shortest focal length of the entire system, fT is the longest focal length of the entire system, and f4 is the focal length of the fourth lens unit.

Further, it is preferred that the zoom lens of the character described above is provided with at least one aspheric surface formed to such a shape as to satisfy the following condition:

$$0.005 < |X - X_0|/EA < 0.05 \quad (7)$$

where X is the axial distance from the vertex of the aspheric surface to the position for a ray effective diameter, $X_0$ is the axial distance from the vertex of the aspheric surface to the position for a ray effective diameter determined by a sphere as derived from the curvature of only the paraxial zone of the aspheric surface and EA is the ray effective diameter of the aspheric surface.

In here, it should be noted that the fourth lens unit comprises a positive lens, a negative meniscus lens whose rear surface is of strong concave curvature toward the image side (or stronger in refracting power than the other surface), a positive lens and a negative lens whose front surface is of strong concave curvature toward the object side. So, it is better to provide such a fourth lens unit with an aspheric surface of such a shape that the positive refracting power gets progressively weaker as the height from the optical axis increases to the margin.

Though the foregoing has been described as separated to a constitution that fulfills the conditions (1), (2), (3) and (4), and another constitution that fulfills the conditions (5), (6) and (7), it is understood that if both are considered in combination, more improved effects result.

The significances of the limits of each of the above-described conditions are explained below.

The inequalities of condition (1) give a range for the ratio of the zooming movements of the first lens unit and the second lens unit and have an aim to assure production of the lens system in compact form. Since the first lens unit is used to compensate for the image shift, its movement with zooming from the wide-angle end to the telephoto end is controlled in such a manner that, taking the wide-angle end as the start point, when in a middle focal length setting, its position is closest to the image side and then, when in the telephoto end, it comes to almost the same position as in the wide-angle end. In other words, it is meant that the first lens unit reciprocates nearly completely. When the upper limit is exceeded, as this implies that the focal lengths of both lens units are too short, it is advantageous at improving the compact form, but it becomes difficult to correct aberrations. When the lower limit is exceeded, it is advantageous at correcting aberrations, but the lens system becomes larger in bulk and size.

The inequalities of condition (2) give a range for the ratio of the optical total length for the wide-angle end to the shortest focal length of the entire system and have an aim chiefly to get a desired F-number and to secure a certain back focal distance. When the lower limit is exceeded, it becomes difficult to secure the desired F-number and the predetermined back focal distance. When the upper limit is exceeded, it is advantageous at correcting aberrations, but the total length increases objectionably.

The inequalities of condition (3) give a range for the ratio of the axial length from the front vertex of the first lens unit to the frontmost surface in the third lens unit to the optical total length for the wide-angle end and have an aim to minimize the outermost diameter among the members of the first lens unit. When the lower limit is exceeded, it is advantageous at minimizing the outermost diameter, but it becomes difficult to obtain a desired zoom ratio with the maintenance of good optical performance. When the upper limit is exceeded, the outer diameter of the first lens unit increases greatly.

The inequalities of condition (4) give a range for the ratio of the total zooming movements of the second lens unit and the third lens unit and have an aim to make a good compromise between the aberration correction and the improvement of the compact form. When the lower limit is exceeded, as this implies that the movement of the third lens unit is too small compared with the movement of the second lens unit, the deviation from the complete reciprocation type described before increases objectionably. When the upper limit is exceeded, the advantage arising from the use of the multi-unit configuration is diminished, so that it becomes difficult to improve the compact form.

Meanwhile, the prior known wide-angle zoom lenses have a defect that the image quality in the marginal zone deteriorates when in the wide-angle region. From the point of view of improving this, the conditions (5) and (6) are explained below.

The inequalities of condition (5) give a range for the ratio of the focal length of the fourth lens unit to the focal length for the wide-angle end of the entire system. The inequalities of condition (6) give a range for the ratio of the focal length of the fourth lens unit to the focal length for the telephoto end of the entire system. In either case, when the focal length of the fourth lens unit is too short as exceeding the lower limit, it is advantageous at improving the compact form, but the image aberrations in the marginal zone, particularly curvature of field, deteriorate. When the focal length of the fourth lens unit is too long as exceeding the upper limit, it favors the aberration correction, but the lens system increases in bulk and size objectionably.

Further, in the present embodiment, as mentioned before, the first lens unit is constructed with the negative meniscus lens concave toward the image side, the negative lens and the positive lens. With this, the off-axial light beam, when zooming to the wide-angle end, is incident farthest from the optical axis. On this account, this surface is made aspheric in such a shape that the positive refracting power gets progressively stronger as going from the center to the margin, thereby correcting barrel type distortion most effectively. At the same time, the outer diameter of the first lens unit is minimized.

The fourth lens unit, on the other hand, in the present embodiment, is provided with the aspheric surface of such a shape that the positive refracting power gets progressively weaker as going from the center to the margin as mentioned before, thereby correcting field curvature of higher orders which are produced when zooming to the wide-angle end, that is, the field curvature that tends to become over-corrected in the marginal zone, and sagittal flare. To make sufficient the effect of correcting the aforesaid aberrations, it is better to control the aspheric amount of this aspheric surface according to the condition (7).

The inequalities of condition (7) give a range for the departure of the asphere from the sphere. When the departure is too large as exceeding the upper limit, the performance in the marginal zone is improved when in the wide-angle end, but the field curvature in the middle zone of the image frame becomes under-corrected objectionably. When the departure is too small as exceeding the lower limit, the performance in the marginal zone deteriorates when in the wide-angle end.

For the specification to improve, it is better to narrow the ranges of the conditions (1) and (2) as follows:

$$-0.1 < M1/M2 < 0 \quad (1')$$

$$7.1 < TLW/fW < 8.0 \quad (2')$$

It is also to be noted that, since, in the numerical examples of the invention, the first lens unit is comprised of the negative meniscus lens having a strong concave surface facing the image side, the negative lens and the positive lens, because the front surface of the negative meniscus lens is used to form an aspheric surface of such shape that the positive refracting power gets progressively stronger toward the margin, it is in the regions of shorter focal lengths that distortion is corrected most effectively. Further, since the second lens unit is comprised of the cemented lens of the negative lens and the positive lens and the positive lens, because the total number of constituent lenses in the first lens unit and the second lens unit is as few as 6, which in turn constitute that part of the entire system which lies ahead of the stop, the outer diameter of the first lens unit is made shorter than was heretofore possible despite the zoom lens having a super wide angular field coverage.

Further, since the third lens unit is comprised of the negative lens and the cemented lens of the negative lens and the positive lens, and the fourth lens unit is comprised of the positive lens, the negative meniscus lens concave toward the image side, the positive lens and the negative lens having a strong concave surface facing the object side, a compact, high performance zoom lens is thus achieved.

It is also to be noted that recently, in the art of single-lens reflex cameras, automatic focusing is widespread and a focusing method suited to this is desired. One of the factors is to reduce the weight of the focusing lens unit. On this account, in the present embodiment, the first lens unit is divided into the lens sub-units 1a and 1b. Of these, the lens sub-unit 1b is relatively light in weight. So, this is used for focusing.

Two numerical examples of zoom lenses of the invention are shown in the following tables, where ri is the radius of curvature of the i-th lens surface when counted from the object side, di is the i-th axial thickness or air separation, and ni and vi are respectively the refractive index and Abbe number of the i-th lens element.

The shape of an aspheric surface is expressed in the coordinates with an X axis in the axial direction (direction in which light advances) and an Y axis in the direction perpendicular to the optical axis by the following equation:

$$X = (1/R)Y^2/(1 + \sqrt{1 - (Y/R)^2}) + BY^4 + CY^6 + DY^8 + EY^{10}$$

where R is the radius of the osculating sphere, and B, C, D and E are the aspheric coefficients.

Numerical Example 1:

| f = 18.6–34.1 | Fno. = 1:2.9 | | 2ω = 98.5°–68.8° |
|---|---|---|---|
| r1 = 56.566* | d1 = 2.20 | n1 = 1.77250 | v1 = 49.6 |
| r2 = 19.526 | d2 = Variable | | |
| r3 = –63.187 | d3 = 1.60 | n2 = 1.83481 | v2 = 42.7 |
| r4 = 92.084 | d4 = 2.59 | | |
| r5 = 104.118 | d5 = 2.64 | n3 = 1.84666 | v3 = 23.9 |
| r6 = –217.150 | d6 = Variable | | |
| r7 = 100.667 | d7 = 1.20 | n4 = 1.84666 | v4 = 23.9 |
| r8 = 25.155 | d8 = 4.38 | n5 = 1.48749 | v5 = 70.2 |
| r9 = –133.663 | d9 = 0.15 | | |
| r10 = 33.081 | d10 = 4.38 | n6 = 1.63980 | v6 = 34.5 |
| r11 = –78.465 | d11 = Variable | | |
| r12 = (Stop) | d12 = 2.60 | | |
| r13 = –48.511 | d13 = 1.20 | n7 = 1.88300 | v7 = 40.8 |
| r14 = 3231.837 | d14 = 1.55 | | |
| r15 = –49.492 | d15 = 1.10 | n8 = 1.72916 | v8 = 54.7 |
| r16 = 35.048 | d16 = 3.92 | n9 = 1.84666 | v9 = 23.9 |
| r17 = –105.169 | d17 = Variable | | |
| r18 = 32.273 | d18 = 7.05 | n10 = 1.69680 | v10 = 55.5 |
| r19 = –39.040 | d19 = 1.00 | n11 = 1.67270 | v11 = 32.1 |
| r20 = –169.172 | d20 = 0.15 | | |
| r21 = 26.496 | d21 = 1.31 | n12 = 1.80518 | v12 = 25.4 |
| r22 = 20.984 | d22 = 3.78 | | |
| r23 = 127.830 | d23 = 8.52 | n13 = 1.67000 | v13 = 57.3 |
| r24 = –19.393 | d24 = 1.60 | n14 = 1.84666 | v14 = 23.8 |
| r25 = –58.611* | d25 = Variable | | |
| r26 = (Stop for cutting harmful light) | | | |

*Aspheric Surface

| Variable | Focal Length | | |
|---|---|---|---|
| Separations | 18.63 | 27.38 | 34.11 |
| d2 | 16.13 | 16.13 | 16.13 |
| d6 | 17.20 | 5.45 | 1.05 |
| d11 | 0.95 | 6.20 | 9.46 |
| d17 | 9.70 | 4.44 | 1.18 |
| d25 | 0.00 | 8.79 | 15.93 |

| Aspheric | Aspheric Surface | |
|---|---|---|
| Coefficients | 1st | 25th |
| B | 6.245826 × 10$^{-6}$ | 8.735161 × 10$^{-6}$ |
| C | 1.576654 × 10$^{-9}$ | 1.246236 × 10$^{-8}$ |
| D | –4.269055 × 10$^{-12}$ | –2.842102 × 10$^{-12}$ |
| E | 9.625567 × 10$^{-15}$ | 1.361095 × 10$^{-13}$ |

EA (Ray Effective Diameter of 25th Surface) = φ27

Numerical Example 2:

| f = 18.5–34.1 | Fno. = 1:2.9 | | 2ω = 98.8°–64.8° |
|---|---|---|---|
| r1 = 56.477* | d1 = 2.20 | n1 = 1.77250 | v1 = 49.6 |
| r2 = 19.318 | d2 = Variable | | |
| r3 = –56.001 | d3 = 1.60 | n2 = 1.80400 | v2 = 46.6 |
| r4 = 114.640 | d4 = 3.12 | | |
| r5 = 138.086 | d5 = 2.40 | n3 = 1.84666 | v3 = 23.9 |
| r6 = –182.979 | d6 = Variable | | |
| r7 = 126.450 | d7 = 1.20 | n4 = 1.84666 | v4 = 23.9 |
| r8 = 27.627 | d8 = 4.49 | n5 = 1.48749 | v5 = 70.2 |
| r9 = –83.229 | d9 = 0.15 | | |
| r10 = 34.450 | d10 = 4.45 | n6 = 1.63980 | v6 = 34.5 |
| r11 = –78.015 | d11 = Variable | | |
| r12 = (Stop) | d12 = 2.91 | | |
| r13 = –51.628 | d13 = 2.04 | n7 = 1.88300 | v7 = 40.8 |
| r14 = –2050.673 | d14 = 1.49 | | |
| r15 = –46.631 | d15 = 1.42 | n8 = 1.72916 | v8 = 54.7 |
| r16 = 39.508 | d16 = 3.58 | n9 = 1.84666 | v9 = 23.9 |
| r17 = –113.167 | d17 = Variable | | |
| r18 = 29.737 | d18 = 6.88 | n10 = 1.69680 | v10 = 55.5 |
| r19 = –41.111 | d19 = 1.00 | n11 = 1.71850 | v11 = 33.5 |
| r20 = –162.080 | d20 = 0.15 | | |
| r21 = 29.823 | d21 = 1.31 | n12 = 1.80518 | v12 = 25.4 |
| r22 = 21.504 | d22 = 3.27 | | |
| r23 = 80.120 | d23 = 9.21 | n13 = 1.61800 | v13 = 63.4 |
| r24 = –19.327 | d24 = 1.60 | n14 = 1.80518 | v14 = 25.4 |
| r25 = –60.421* | d25 = Variable | | |
| r26 = (Stop for cutting harmful light) | | | |

*Aspheric Surface

| Variable | Focal Length | | |
|---|---|---|---|
| Separations | 18.54 | 28.01 | 34.09 |
| d2 | 16.34 | 16.34 | 16.34 |
| d6 | 16.97 | 4.86 | 1.05 |
| d11 | 0.89 | 6.73 | 9.64 |
| d17 | 9.65 | 3.82 | 0.91 |
| d25 | 0.00 | 9.43 | 15.85 |

| Aspheric Coefficients | Aspheric Surface | |
|---|---|---|
| | 1st | 25th |
| B | $6.332965 \times 10^{-6}$ | $9.911284 \times 10^{-6}$ |
| C | $1.547466 \times 10^{-9}$ | $1.760862 \times 10^{-8}$ |
| D | $-4.273660 \times 10^{-12}$ | $-1.216068 \times 10^{-11}$ |
| E | $1.013502 \times 10^{-14}$ | $2.611625 \times 10^{-13}$ |

EA (Ray Effective Diameter of r25) = φ26.8

TABLE 1

| Condition No. | Factor | Limit Lower | Limit Upper | Numerical Example 1 | Numerical Example 2 |
|---|---|---|---|---|---|
| (1) | M1/M2 | −0.3 | 1 | −0.014 | −0.005 |
| (2) | TLW/fW | 6 | 10 | 7.3 | 7.378 |
| (3) | LSP/TLW | 0.37 | 0.47 | 0.412 | 0.4156 |
| (4) | M3/M2 | 0.4 | 0.7 | 0.465 | 0.448 |
| (5) | f4/fW | 1.5 | 3 | 1.958 | 2.074 |
| (6) | f4/fT | 0.7 | 1.8 | 1.069 | 1.128 |
| (7) | $|X-X_0|$/EA | 0.005 | 0.05 | 0.014 | 0.017 |

For each of the above-described conditions (1) to (7), if their upper or lower limits or both are altered to narrow the ranges to the values in these numerical examples, more improved results are attained.

As has been described above, according to the invention, it is made possible to achieve a compact, high performance zoom lens whose total angular field for the wide-angle end covers a wide angle region of 100° and thereabout and which has an F-number of 1:2.8 and a zoom ratio of 1.8 or thereabout.

Another embodiment of the invention in which improvements are made over the foregoing embodiment is described below.

FIGS. 5 to 13 in block diagrams show numerical examples 3 to 11 of zoom lenses of the invention in the wide-angle end. In these figures, reference character LF denotes a front lens group of negative refractive power and reference character LR denotes a rear lens group of positive refractive power. SP stands for the aperture stop, SK for a fixed flare cut stop and SV for a movable flare cut stop.

In the present embodiment, the front lens group LF is constructed with a first lens unit L1 of negative refractive power. The first lens unit L1 is constructed with a front lens sub-unit L11 of negative refractive power and a rear lens sub-unit L12 of negative refractive power. Focusing is performed by axially moving the rear lens sub-unit L12. (Incidentally, in the present embodiment, the first lens unit L1 may otherwise be moved as a whole to effect focusing)

The rear lens group LR is constructed with a second lens unit L2 of positive refractive power, a third lens unit L3 of negative refractive power and a fourth lens unit L4 of positive refractive power, totaling three lens units.

In the drawings, the arrows indicate the loci of movement of all the lens units.

That is, when zooming from the wide-angle end to the telephoto end, all the lens units are axially moved in such relation that the separation between the first lens unit L1 and the second lens unit L2 decreases, the separation between the second lens unit L2 and the third lens unit L3 increases and the separation between the third lens unit L3 and the fourth lens unit L4 decreases.

In a specific embodiment, when zooming from the wide-angle end to the telephoto end, the second and fourth lens units move in unison toward the object side, the third lens unit moves toward the object side in differential relation, and the first lens unit first moves toward the image side in a region of from the wide-angle end to a middle focal length position and then toward the object side in a region of from the middle focal length position to the telephoto end. As the movements of the second and fourth lens units are linear (proportional to the variation of the focal length), the movement of third lens unit is made non-linear, thereby correcting aberrations well in the middle focal length region. It should be noted that, in a numerical example 4 to be described more fully later, at least one of the front and rear lens sub-units L11 and L12 of the first lens unit L1 is made to move with zooming in such relation that their separation is widest in the middle focal length position.

In the present embodiment, use is made of three lens units in forming the rear lens group LR and, when zooming, all these lens units are made to axially move in the relation described above, thereby bringing the principal point of the rear lens group LR forward as zooming from the wide-angle end to the telephoto end. This assures an increase of the effect of varying the focal length by the front and rear lens groups LF and LR. The predetermined zoom ratio is thus effectively obtained.

Figure 5:
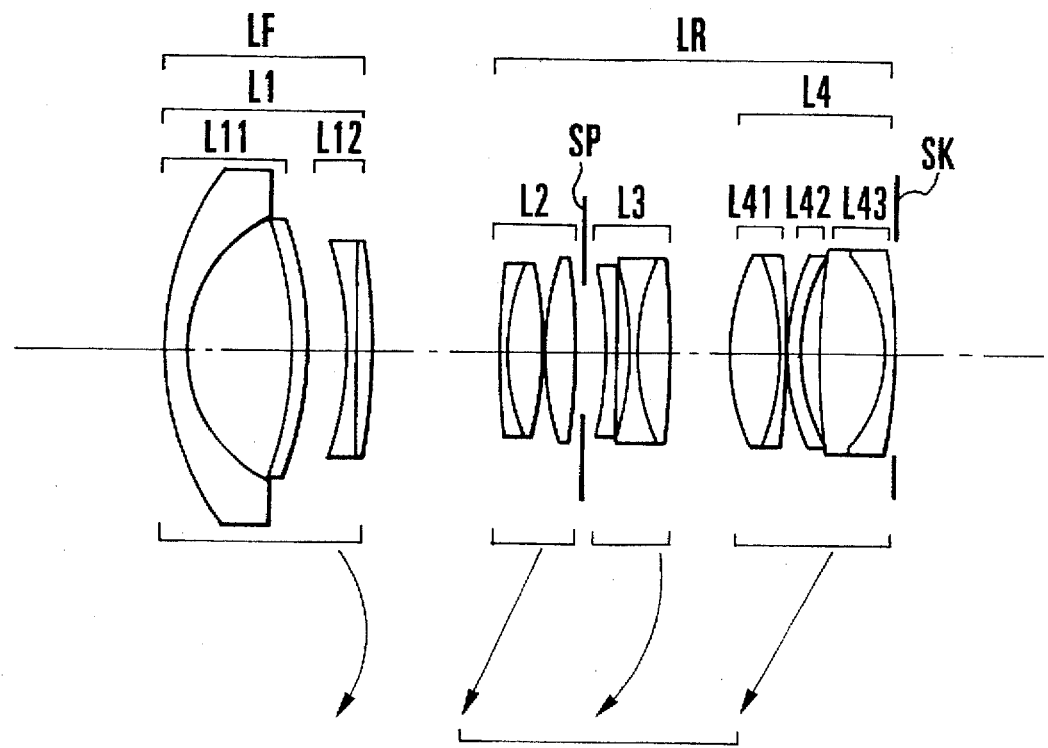
FIG. 5 is a longitudinal section view of a numerical example 3 of the zoom lens of the invention.
Figure 6:
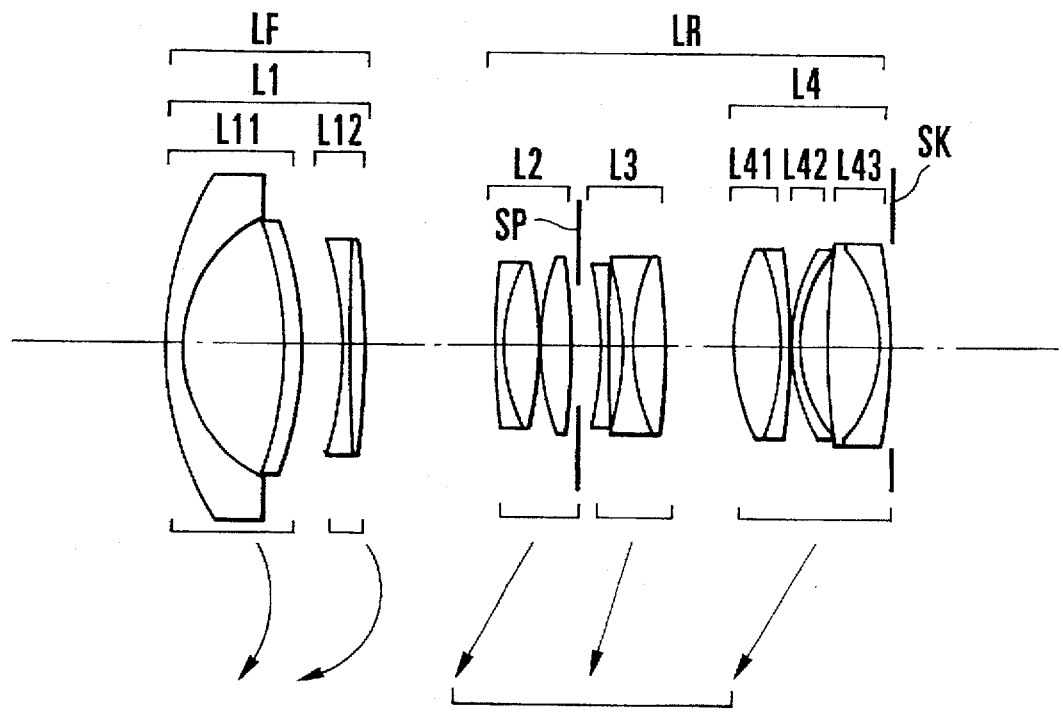
FIG. 6 is a longitudinal section view of a numerical example 4 of the zoom lens of the invention.
Figure 7:
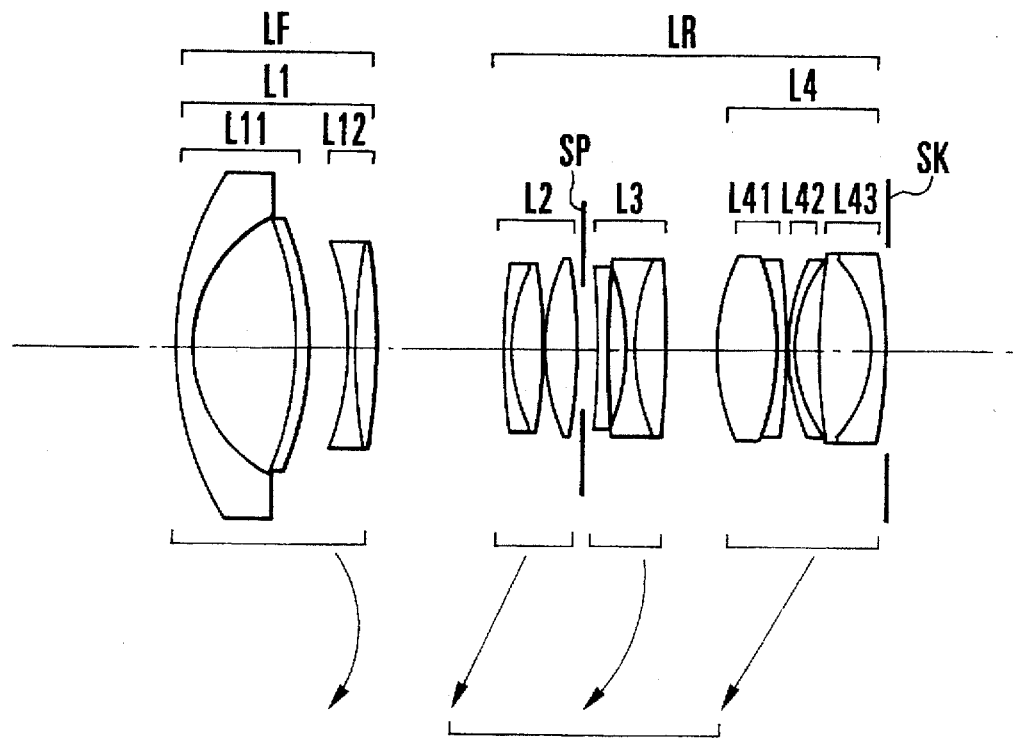
FIG. 7 is a longitudinal section view of a numerical example 5 of the zoom lens of the invention.
Figure 8:
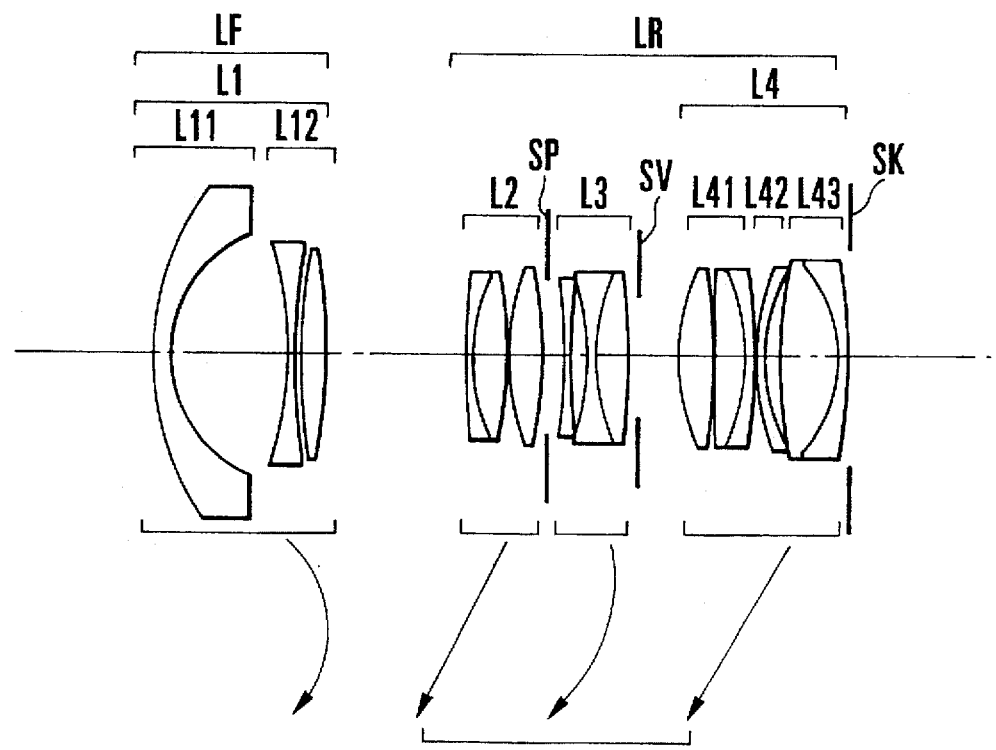
FIG. 8 is a longitudinal section view of a numerical example 6 of the zoom lens of the invention.
Figure 9:
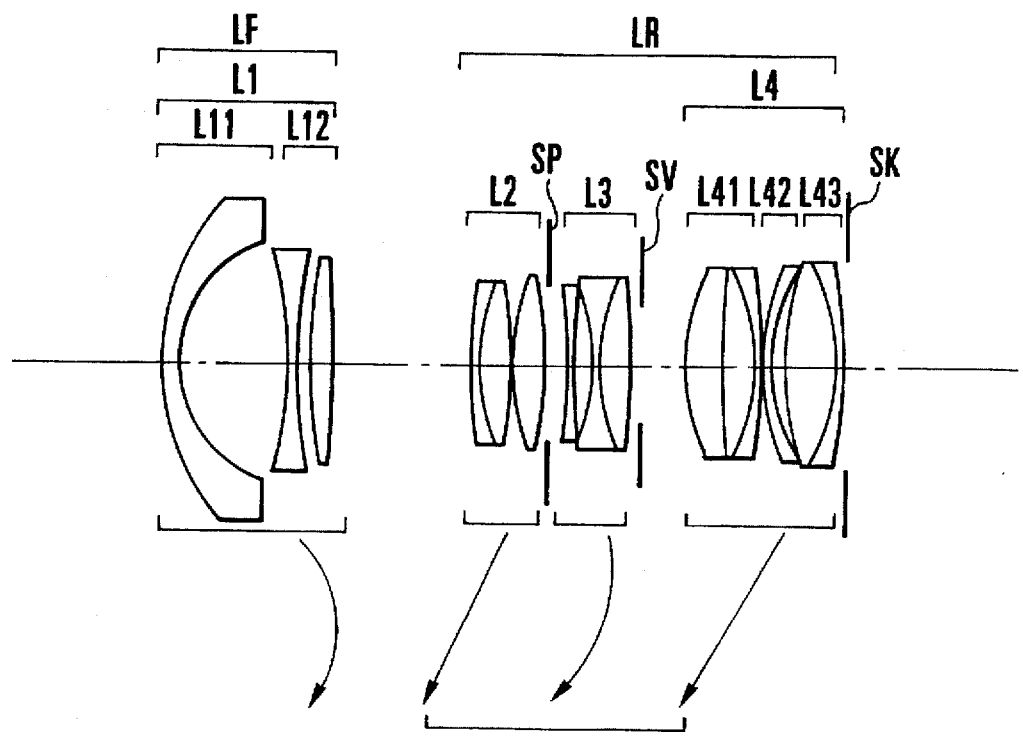
FIG. 9 is a longitudinal section view of a numerical example 7 of the zoom lens of the invention.
Figure 10:
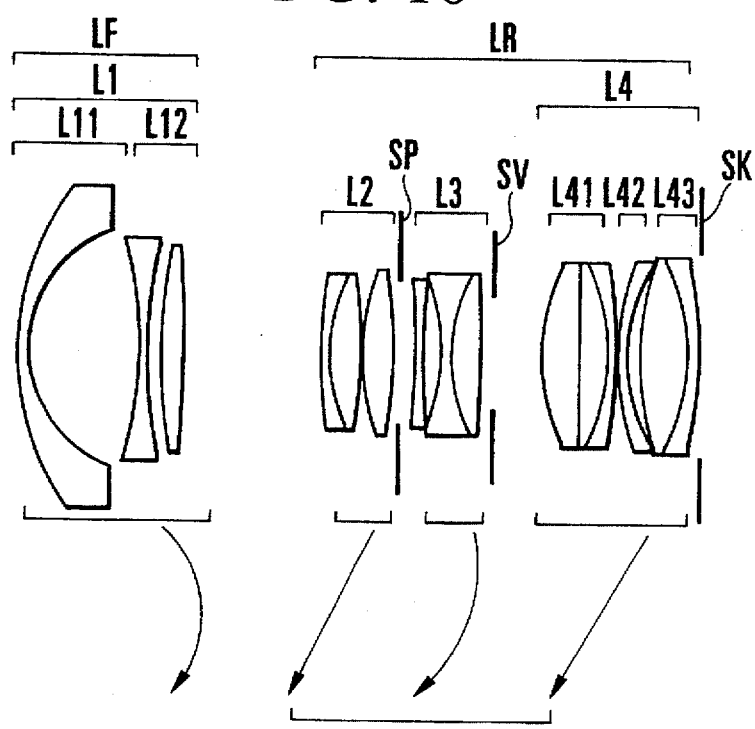
FIG. 10 is a longitudinal section view of a numerical example 8 of the zoom lens of the invention.
Figure 11:
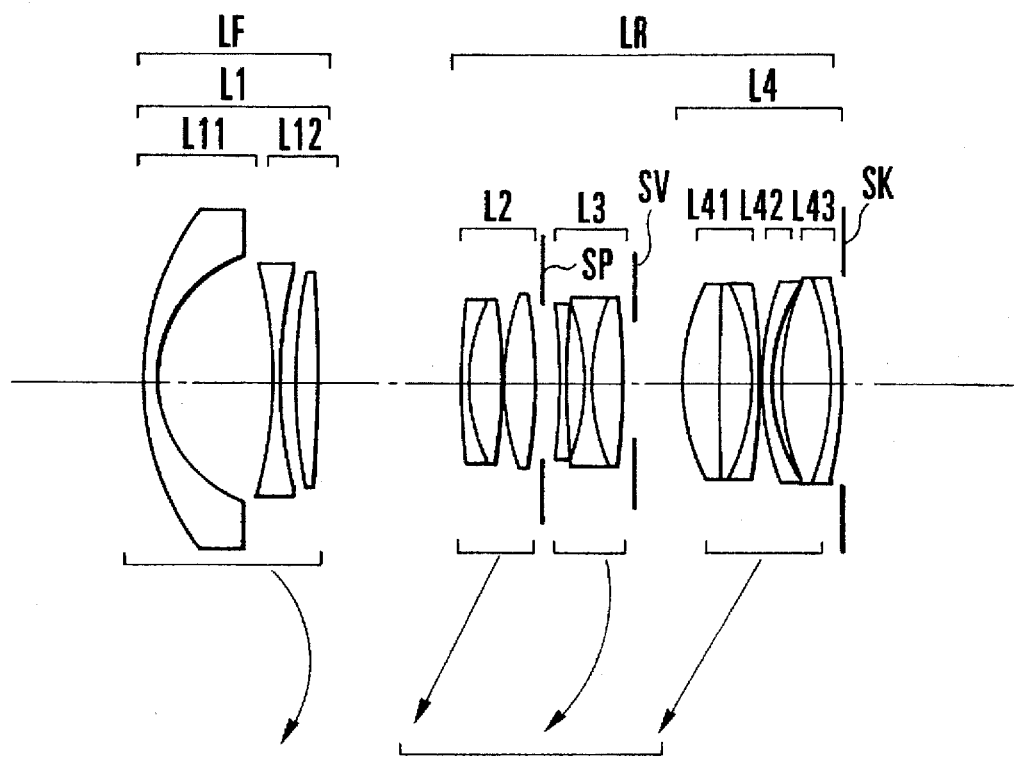
FIG. 11 is a longitudinal section view of a numerical example 9 of the zoom lens of the invention.
Figure 12:
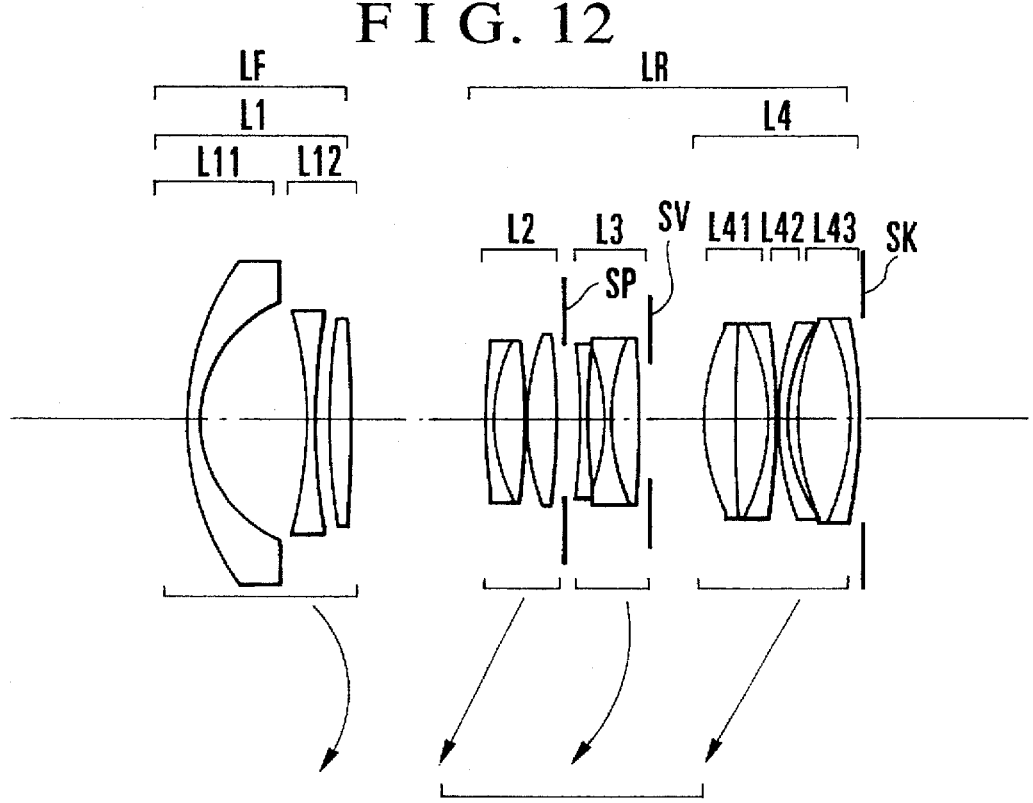
FIG. 12 is a longitudinal section view of a numerical example 10 of the zoom lens of the invention.
Figure 13:
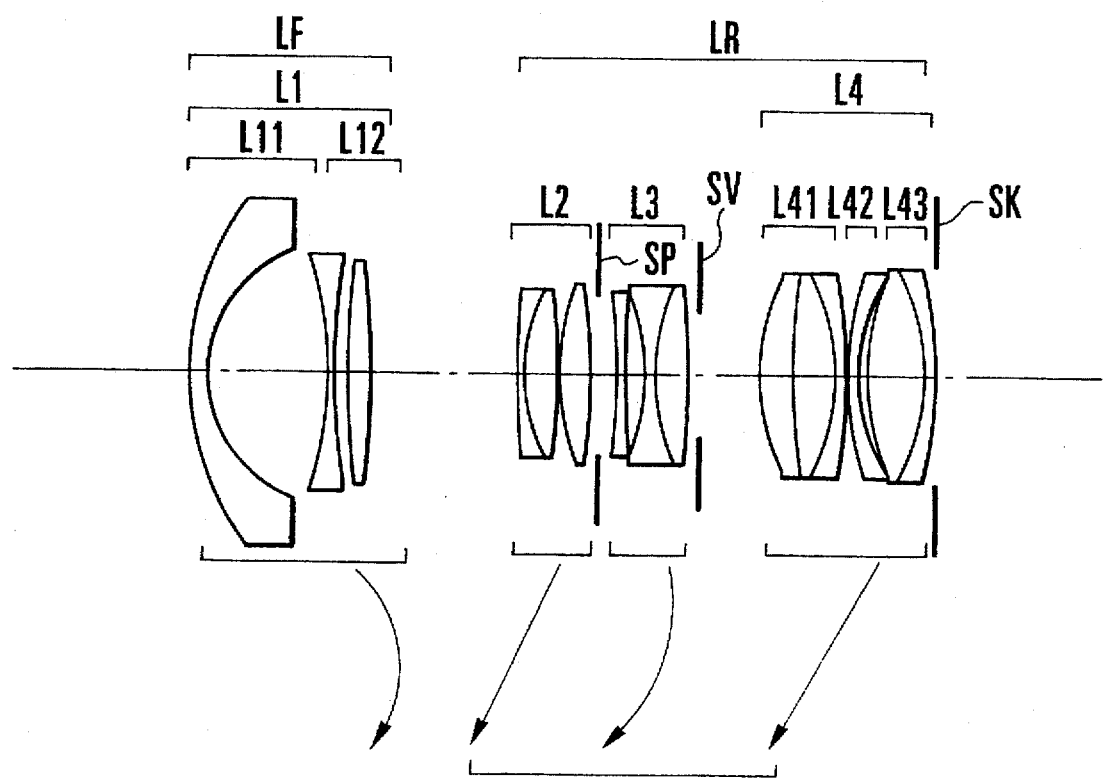
FIG. 13 is a longitudinal section view of a numerical example 11 of the zoom lens of the invention.

A first lens sub-unit L41 of positive refractive power in the fourth lens unit is constructed in FIG. 5 and FIG. 6 from a lens composed of a positive lens whose both surfaces are convex and a negative lens of meniscus form convex toward the image side cemented together; in FIG. 7 from two lenses, one of which is a positive lens whose both surfaces are convex and the other of which is a negative lens of meniscus form convex toward the image side; in FIG. 8 from a positive lens and a lens composed of a positive lens and a negative lens of meniscus form convex toward the image side cemented together; and in FIG. 9 to FIG. 13 from a lens composed of two positive lenses and a negative lens cemented together.

In the present embodiment, by using two lenses of opposite sign in the first lens sub-unit L41, in view of utilizing the phenomenon that the off-axial light beam travels farthest from the optical axis, lateral chromatic aberration is corrected effectively.

A second lens sub-unit L42 of negative refractive power in the fourth lens unit is constructed with a single negative lens of meniscus form concave toward the image side. A third lens sub-unit L43 of positive refractive power in the fourth lens unit is constructed with a lens composed of a positive lens and a negative lens of meniscus form concave toward the object side cemented together. The rearmost lens surface in the fourth lens unit is formed to an aspheric shape such that the positive refracting power gets progressively weaker as going from the center to the margin.

Since the fourth lens unit has a relatively strong positive refractive power, the construction and arrangement of its constituent lenses are specified as described above. This leads to correction of spherical aberration, astigmatism and field curvature in good balance. Field curvature of higher orders which is produced when zooming to the wide-angle end, too, is well corrected by using an aspheric surface in the negative lens of the second lens sub-unit L42. In addition, the second lens unit L2 is constructed with a lens composed of a negative lens of meniscus form and a positive lens cemented together and a positive lens, thereby well correcting various aberrations.

Further, the first lens unit is included with an aspheric surface of such shape that the positive refracting power gets progressively stronger as going from the center to the margin, thereby correcting the barrel type distortion which is produced when zooming to the wide-angle end. The frontmost lens is made to be a negative lens of meniscus form concave toward the image side, thereby minimizing the outer diameter of the first lens unit. A flare cut stop SK is positioned on the image side of the last lens unit and remains stationary during zooming, thereby removing flare in the telephoto region.

In the numerical examples 6 to 11 of FIGS. 8 to 13, another flare cut stop SV is arranged on the image side of the third lens unit to move in unison with the third lens unit and its aperture opening varies in size with variation of the focal length, thereby removing flare in the middle zone of the image frame when zooming to the wide-angle end.

Besides the above-described features which are characteristic of the present embodiment set forth for the refractive powers of all the lens units, the relation in which the lens units move during zooming and the construction and arrangement of the constituent lenses of each of the lens units, the following condition is satisfied:

$$6 < TLW/fW < 10 \tag{8}$$

where TLW is the optical total length for the wide-angle end and fW is the shortest focal length of the entire system. When this condition (8) is also satisfied, a zoom lens of shortened total length with a wide-angular field coverage, while still maintaining high optical performance throughout the entire zooming range is obtained.

The inequalities of condition (8) give a range for the ratio of the optical total length (the distance from the front vertex to the image plane) for the wide-angle end to the shortest focal length of the entire system, or the so-called telephoto ratio, and have an aim chiefly to secure a desired F-number and back focal distance. When the lower limit of the condition (8) is exceeded, it becomes difficult to secure the desired F-number and back focal distance. When the upper limit is exceeded, it is advantageous at correcting aberrations, but the optical total length increases objectionably.

With the zoom lens of the invention, when simultaneously fulfilling the requirements of widening the angular field coverage for the wide-angle end to 100° or thereabout and of securing high optical performance over the entire zooming range and over the entire area of the image frame, it is preferred to satisfy at least one of the following sets of conditions:

(i) Letting the total zooming movement of the i-th lens unit be denoted by Mi, the focal length of the i-th lens unit by fi, the shortest focal length of the entire system by fW, the longest focal length of the entire system by fT, the axial length for the wide-angle end from the front vertex of the first lens unit to the frontmost lens surface of the third lens unit by LSP, the ray effective diameter of the aspheric surface by EA, the axial distance from the vertex of the aspheric surface to the position for the ray effective diameter by X, and the axial distance from the vertex of the aspheric surface to the position for a ray effective diameter determined by a sphere as derived from the curvature of only the paraxial zone of the aspheric surface by $X_0$, the following conditions are satisfied:

$$-0.3 < M1/M2 < 0.3 \tag{9}$$

$$0.005 < |X - X_0|/EA < 0.05 \tag{10}$$

$$1.5 < f4/fW < 3 \tag{11}$$

$$0.7 < f4/fT < 1.8 \tag{12}$$

$$0.37 < LSP/TLW < 0.47 \tag{13}$$

$$0.4 < M3/M2 < 0.7 \tag{14}$$

The inequalities of condition (9) give a range for the ratio of the zooming movements of the first and second lens units and have an aim chiefly to make compact the lens system. This range means that for the first lens unit to compensate for the image shift, as zooming from the wide-angle end to the telephoto end, taking the wide-angle end as the start point, the first lens unit first puts itself nearest to the image plane when zooming reaches a middle focal length position and then comes to almost the same position as in the wide-angle end when zooming to the telephoto end. In other word, it expresses a nearly complete reciprocation. When the upper limit of the condition (9) is exceeded, the focal length of each of the lens units becomes short. This is advantageous at improving the compact form, but it becomes difficult to correct aberrations. When the lower limit is exceeded, it is advantageous at correcting aberrations, but the lens system increases largely.

The inequalities of condition (10) give a range for the departure of the aspheric surface applied to the rearmost surface of the fourth lens unit from a sphere and have an aim chiefly to correct field curvature of higher orders for the wide-angle end, that is, the field curvature which would otherwise be over-corrected in the marginal zone, and sagittal flare. When the condition (10) is satisfied, these aberrations are corrected well enough.

The inequalities of condition (11) give a range for the ratio of the focal length of the fourth lens unit to the shortest focal length of the entire system, and the inequalities of condition (12) give a range for the ratio of the focal length of the fourth lens unit to the longest focal length of the entire system. When the lower limit of any of the conditions (11) and (12) is exceeded, as this implies that the focal length of the fourth lens unit is too short, it is advantageous at improving the compact form, but aberrations, particularly field curvature, in the marginal zone deteriorate. When the upper limit of any of the conditions (11) and (12) is exceeded, as this implies that the focal length of the fourth lens unit is too long, it favors aberration correction, but the lens system increases objectionably.

The inequalities of condition (13) give a range for the ratio of the length from the front vertex of the first lens unit to the frontmost lens surface of the third lens unit to the optical total length for the wide-angle end and have an aim chiefly to minimize the outer diameter of the first lens unit. When the lower limit of the condition (13) is exceeded, it is advantageous at minimizing the outer diameter, but it becomes difficult to obtain the desired zoom ratio with the maintenance of the optical performance. When the upper limit is exceeded, the outer diameter of the first lens unit increases largely.

The inequalities of condition (14) give a range for the ratio of the zooming movements of the second and third lens units and have an aim chiefly to make a good compromise between the aberration correction and the improvement of the compact form. When the lower limit of the condition (14) is exceeded, as this implies that the movement of the third lens unit is small as compared with the movement of the second lens unit, the deviation from the complete reciprocation type increases objectionably. When the upper limit is exceeded, the effect resulting from the use of the multi-unit configuration is diminished so that it becomes difficult to improve the compact form.

(ii) The second lens unit comprises, from front to rear, a negative first lens of meniscus form concave toward the image side, a positive second lens and a positive third lens, satisfying the following conditions:

$$1.7 < N21 \quad (15)$$

$$30 < \nu 21 \quad (16)$$

where N21 and ν21 are respectively the refractive index and Abbe number of the material of the first lens.

The inequalities of conditions (15) and (16) have an aim to correct well longitudinal chromatic aberration, particularly secondary spectrum, by using a low dispersion, high index material in the frontmost lens in the second lens unit, or the negative first lens of meniscus form. When the conditions (15) and (16) are violated, it becomes difficult to well correct chromatic aberrations.

(iii) In the third lens sub-unit of the fourth lens unit, the negative lens of meniscus form concave toward the object side is made of a material whose refractive index N432 and Abbe number ν432 satisfy the following conditions:

$$1.7 < N432 \quad (17)$$

$$30 < \nu 432 \quad (18)$$

The inequalities of conditions (17) and (18) have an aim to well correct longitudinal chromatic aberration by using a low dispersion, high index material in the negative lens of meniscus shape concave toward the object side in the third lens sub-unit of the fourth lens unit. When the conditions (17) and (18) are violated, it becomes difficult to correct well longitudinal chromatic aberration.

Next, numerical examples 3 to 11 of the invention are shown. In the numerical data for the examples 3 to 11, ri is the radius of curvature of the i-th lens surface, when counted from the object side, di is the axial thickness or air separation, and ni and νi are respectively the refractive index and Abbe number of the material of the i-th lens element.

The shape of an aspheric surface is expressed in the coordinates with an X axis in the axial direction (direction in which light advances) and a Y axis in the direction perpendicular to the optical axis by the following equation:

$$X = (1/R)Y^2/(1 + \sqrt{1 - (Y/R)^2}) + BY^4 + CY^6 + DY^8 + EY^{10} + FY^{12} + GY^{14}$$

where R is the radius of the osculating sphere, and B, C, D, E, F and G are the aspheric coefficients.

The values of the factors in the above-described conditions (8) to (18) for the numerical examples 3 to 11 are listed in Table-2.

Numerical Example 3:

f = 18.5–34.1　　Fno. = 1:2.9　　2ω = 98.8°–64.8°

| | | | |
|---|---|---|---|
| r1 = 66.61* | d1 = 2.20 | n1 = 1.77250 | ν1 = 49.6 |
| r2 = 19.50 | d2 = 14.21 | | |
| r3 = –49.03 | d3 = 2.20 | n2 = 1.78590 | ν2 = 44.2 |
| r4 = –51.70 | d4 = Variable | | |
| r5 = –42.65 | d5 = 1.20 | n3 = 1.83481 | ν3 = 42.7 |
| r6 = –10141.30 | d6 = 2.26 | n4 = 1.84666 | ν4 = 23.9 |
| r7 = –78.23 | d7 = Variable | | |
| r8 = 113.20 | d8 = 1.10 | n5 = 1.84666 | ν5 = 23.8 |
| r9 = 30.25 | d9 = 4.60 | n6 = 1.48749 | ν6 = 70.2 |
| r10 = –59.58 | d10 = 0.15 | | |
| r11 = 34.66 | d11 = 4.35 | n7 = 1.62004 | ν7 = 36.3 |

-continued

Numerical Example 3:

f = 18.5–34.1　　Fno. = 1:2.9　　2ω = 98.8°–64.8°

| | | | |
|---|---|---|---|
| r12 = –77.21 | d12 = Variable | | |
| r13 = (Stop) | d13 = 3.08 | | |
| r14 = –46.81 | d14 = 1.29 | n8 = 1.88300 | ν8 = 40.8 |
| r15 = 373.45 | d15 = 1.63 | | |
| r16 = –46.63 | d16 = 1.28 | n9 = 1.71300 | ν9 = 53.8 |
| r17 = 29.87 | d17 = 4.35 | n10 = 1.84666 | ν10 = 23.9 |
| r18 = –111.10 | d18 = Variable | | |
| r19 = 30.51 | d19 = 6.68 | n11 = 1.69680 | ν11 = 55.5 |
| r20 = –35.74 | d20 = 1.00 | n12 = 1.76182 | ν12 = 26.5 |
| r21 = –116.40 | d21 = 0.20 | | |
| r22 = 31.43 | d22 = 1.31 | n13 = 1.80518 | ν13 = 25.4 |
| r23 = 21.79 | d23 = 2.97 | | |
| r24 = 81.54 | d24 = 8.84 | n14 = 1.60311 | ν14 = 60.7 |
| r25 = –19.64 | d25 = 1.60 | n15 = 1.80518 | ν15 = 25.4 |
| r26 = –54.29* | d26 = Variable | | |
| r27 = Flare Stop | | | |

*Aspheric Surface

| Variable | Focal Length | | |
|---|---|---|---|
| Separations | 18.54 | 27.94 | 34.09 |
| d4 | 5.27 | 5.27 | 5.27 |
| d7 | 17.17 | 4.95 | 1.03 |
| d12 | 0.97 | 5.65 | 8.15 |
| d18 | 8.09 | 3.41 | 0.91 |
| d26 | 0.00 | 9.59 | 16.12 |

| Aspheric | Aspheric Surface | |
|---|---|---|
| Coefficients | r1 | r26 |
| B | 7.065 × 10⁻⁶ | 9.732 × 10⁻⁶ |
| C | –4.514 × 10⁻¹⁰ | 1.503 × 10⁻⁸ |
| D | –1.415 × 10⁻¹² | 1.014 × 10⁻¹¹ |
| E | 6.497 × 10⁻¹⁵ | 1.813 × 10⁻¹³ |

EA = 26.1

Numerical Example 4:

f = 18.5–34.1　　Fno. = 1:2.9　　2ω = 98.8°–64.8°

| | | | |
|---|---|---|---|
| r1 = 66.43* | d1 = 2.20 | n1 = 1.77250 | ν1 = 49.6 |
| r2 = 19.86 | d2 = 14.17 | | |
| r3 = –49.77 | d3 = 2.20 | n2 = 1.78590 | ν2 = 44.2 |
| r4 = –56.03 | d4 = Variable | | |
| r5 = –54.28 | d5 = 1.20 | n3 = 1.83481 | ν3 = 42.7 |
| r6 = 363.07 | d6 = 2.11 | n4 = 1.84666 | ν4 = 23.9 |
| r7 = –113.76 | d7 = Variable | | |
| r8 = 120.00 | d8 = 1.00 | n5 = 1.84666 | ν5 = 23.8 |
| r9 = 28.41 | d9 = 4.65 | n6 = 1.48749 | ν6 = 70.2 |
| r10 = –61.50 | d10 = 0.15 | | |
| r11 = 34.09 | d11 = 4.30 | n7 = 1.64769 | ν7 = 33.8 |
| r12 = –82.93 | d12 = Variable | | |
| r13 = (Stop) | d13 = 2.84 | | |
| r14 = –54.33 | d14 = 1.25 | n8 = 1.88300 | ν8 = 40.8 |
| r15 = 316.62 | d15 = 1.81 | | |
| r16 = –40.91 | d16 = 1.49 | n9 = 1.69680 | ν9 = 55.5 |
| r17 = 31.17 | d17 = 4.35 | n10 = 1.84666 | ν10 = 23.9 |
| r18 = –100.17 | d18 = Variable | | |
| r19 = 31.99 | d19 = 6.46 | n11 = 1.69680 | ν11 = 55.5 |
| r20 = –36.67 | d20 = 1.20 | n12 = 1.84666 | ν12 = 23.8 |
| r21 = –86.60 | d21 = 0.20 | | |
| r22 = 25.96 | d22 = 1.30 | n13 = 1.84666 | ν13 = 23.8 |
| r23 = 19.89 | d23 = 3.77 | | |
| r24 = 126.85 | d24 = 6.99 | n14 = 1.60311 | ν14 = 60.7 |

Numerical Example 4:

f = 18.5–34.1   Fno. = 1:2.9   2ω = 98.8°–64.8°

| | | | |
|---|---|---|---|
| r25 = −19.09 | d25 = 1.60 | n15 = 1.80518 | v15 = 25.4 |
| r26 = −53.72* | d26 = Variable | | |
| r27 = Flare Stop | | | |

*Aspheric Surface

| Variable | Focal Length | | |
|---|---|---|---|
| Separations | 18.54 | 27.93 | 34.06 |
| d4 | 5.36 | 5.36 | 5.36 |
| d7 | 17.42 | 4.79 | 1.03 |
| d12 | 0.99 | 6.13 | 8.74 |
| d18 | 9.20 | 4.06 | 1.45 |
| d26 | 0.00 | 9.43 | 15.85 |

| Aspheric Coefficients | Aspheric Surface | |
|---|---|---|
| | r1 | r26 |
| B | $6.753 \times 10^{-6}$ | $9.032 \times 10^{-6}$ |
| C | $-7.797 \times 10^{-10}$ | $-9.570 \times 10^{-9}$ |
| D | $-1.713 \times 10^{-13}$ | $4.048 \times 10^{-10}$ |
| E | $4.615 \times 10^{-15}$ | $-3.601 \times 10^{-12}$ |
| F | | $1.685 \times 10^{-14}$ |
| G | | $-2.890 \times 10^{-17}$ |

EA = 26.2

Numerical Example 5:

f = 18.5–34.0   Fno. = 1:2.9   2ω = 98.8°–64.9°

| | | | |
|---|---|---|---|
| r1 = 68.14* | d1 = 2.20 | n1 = 1.77250 | v1 = 49.6 |
| r2 = 19.62 | d2 = 14.46 | | |
| r3 = −45.24 | d3 = 2.10 | n2 = 1.78590 | v2 = 44.2 |
| r4 = −47.05 | d4 = Variable | | |
| r5 = −43.61 | d5 = 1.20 | n3 = 1.83481 | v3 = 42.7 |
| r6 = 94.27 | d6 = 3.02 | n4 = 1.84666 | v4 = 23.9 |
| r7 = −83.20 | d7 = Variable | | |
| r8 = 80.78 | d8 = 1.00 | n5 = 1.84666 | v5 = 23.8 |
| r9 = 26.44 | d9 = 4.65 | n6 = 1.48749 | v6 = 70.2 |
| r10 = −67.68 | d10 = 0.15 | | |
| r11 = 32.55 | d11 = 4.45 | n7 = 1.58267 | v7 = 46.4 |
| r12 = −65.39 | d12 = Variable | | |
| r13 = (Stop) | d13 = 2.35 | | |
| r14 = −109.74 | d14 = 1.34 | n8 = 1.88300 | v8 = 40.8 |
| r15 = 133.12 | d15 = 2.46 | | |
| r16 = −30.16 | d16 = 1.25 | n9 = 1.69680 | v9 = 55.5 |
| r17 = 31.92 | d17 = 4.49 | n10 = 1.84666 | v10 = 23.9 |
| r18 = −143.09 | d18 = Variable | | |
| r19 = 32.22 | d19 = 8.10 | n11 = 1.72916 | v11 = 54.7 |
| r20 = −34.94 | d20 = 0.34 | | |
| r21 = −34.53 | d21 = 1.20 | n12 = 1.83400 | v12 = 37.2 |
| r22 = −100.14 | d22 = 0.20 | | |
| r23 = 29.45 | d23 = 1.30 | n13 = 1.84666 | v13 = 23.8 |
| r24 = 21.44 | d24 = 2.76 | | |
| r25 = 82.37 | d25 = 7.73 | n14 = 1.64850 | v14 = 53.0 |
| r26 = −17.44 | d26 = 1.60 | n15 = 1.80518 | v15 = 25.4 |
| r27 = −59.011* | d27 = Variable | | |
| r28 = Flare Stop | | | |

*Aspheric Surface

| Variable | Focal Length | | |
|---|---|---|---|
| Separations | 18.54 | 27.94 | 34.03 |
| d4 | 5.33 | 5.33 | 5.33 |
| d7 | 17.39 | 5.02 | 1.02 |
| d12 | 0.67 | 4.69 | 6.74 |
| d18 | 6.98 | 2.96 | 0.91 |
| d27 | 0.00 | 9.62 | 16.17 |

| Aspheric Coefficients | Aspheric Surface | |
|---|---|---|
| | r1 | r27 |
| B | $7.324 \times 10^{-6}$ | $1.031 \times 10^{-5}$ |
| C | $-3.105 \times 10^{-9}$ | $-2.779 \times 10^{-8}$ |
| D | $6.459 \times 10^{-12}$ | $8.238 \times 10^{-10}$ |
| E | $-5.426 \times 10^{-15}$ | $-7.967 \times 10^{-12}$ |
| F | $6.147 \times 10^{-18}$ | $3.954 \times 10^{-14}$ |
| G | | $-7.441 \times 10^{-17}$ |

EA = 25.3

Numerical Example 6:

f = 17.5–34.1   Fno. = 1:2.9   2ω = 102.1°–64.8°

| | | | |
|---|---|---|---|
| r1 = 63.75* | d1 = 2.20 | n1 = 1.77250 | v1 = 49.6 |
| r2 = 18.29 | d2 = Variable | | |
| r3 = −48.47 | d3 = 1.20 | n2 = 1.83481 | v2 = 42.7 |
| r4 = 90.31 | d4 = 0.96 | | |
| r5 = 121.39 | d5 = 3.30 | n3 = 1.84666 | v3 = 23.9 |
| r6 = −92.77 | d6 = Variable | | |
| r7 = 92.90 | d7 = 1.00 | n4 = 1.84666 | v4 = 23.8 |
| r8 = 26.84 | d8 = 4.75 | n5 = 1.48749 | v5 = 70.2 |
| r9 = −68.73 | d9 = 0.15 | | |
| r10 = 33.31 | d10 = 4.60 | n6 = 1.69500 | v6 = 42.2 |
| r11 = −68.86 | d11 = Variable | | |
| r12 = (Stop) | d12 = 2.39 | | |
| r13 = −81.43 | d13 = 1.20 | n7 = 1.88300 | v7 = 40.8 |
| r14 = 106.68 | d14 = 2.24 | | |
| r15 = −33.91 | d15 = 1.08 | n8 = 1.69680 | v8 = 55.5 |
| r16 = 27.05 | d16 = 4.40 | n9 = 1.84666 | v9 = 23.9 |
| r17 = −139.67 | d17 = 1.50 | | |
| r18 = Flare Stop | d18 = Variable | | |
| r19 = 28.61 | d19 = 4.80 | n10 = 1.48749 | v10 = 70.2 |
| r20 = −156.08 | d20 = 0.15 | | |
| r21 = −960.41 | d21 = 4.40 | n11 = 1.69680 | v11 = 55.5 |
| r22 = −29.09 | d22 = 0.00 | | |
| r23 = −29.09 | d23 = 1.20 | n12 = 1.85026 | v12 = 32.3 |
| r24 = −94.08 | d24 = 0.20 | | |
| r25 = 38.28 | d25 = 1.30 | n13 = 1.84666 | v13 = 23.8 |
| r26 = 25.22 | d26 = 1.88 | | |
| r27 = 57.23 | d27 = 7.90 | n14 = 1.65844 | v14 = 50.9 |
| r28 = −20.44 | d28 = 1.60 | n15 = 1.80518 | v15 = 25.4 |
| r29 = −58.86* | d29 = Variable | | |
| r30 = Flare Stop | | | |

*Aspheric Surface

| Variable | Focal Length | | |
|---|---|---|---|
| Separations | 17.50 | 27.38 | 34.09 |
| d2 | 16.13 | 16.13 | 16.13 |
| d6 | 19.35 | 5.31 | 1.01 |
| d11 | 0.67 | 4.58 | 6.96 |
| d18 | 5.69 | 1.78 | −0.60 |
| d29 | 0.00 | 10.47 | 17.59 |

| Aspheric Coefficients | Aspheric Surface | |
|---|---|---|
| | r1 | r29 |
| B | $8.297 \times 10^{-6}$ | $9.402 \times 10^{-6}$ |
| C | $-9.993 \times 10^{-10}$ | $2.005 \times 10^{-8}$ |
| D | $-2.758 \times 10^{-12}$ | $-1.009 \times 10^{-10}$ |
| E | $1.311 \times 10^{-14}$ | $9.579 \times 10^{-13}$ |
| F | $-4.383 \times 10^{-18}$ | $-2.344 \times 10^{-15}$ |
| G | | $1.645 \times 10^{-18}$ |

EA = 26.2

Numerical Example 7:

f = 17.5–34.1   Fno. = 1:2.9   2ω = 102.1°–64.8°

| r1 = 52.61* | d1 = 2.00 | n1 = 1.77250 | v1 = 49.6 |
|---|---|---|---|
| r2 = 18.04 | d2 = Variable | | |
| r3 = −54.14 | d3 = 1.20 | n2 = 1.83481 | v2 = 42.7 |
| r4 = 69.93 | d4 = 2.00 | | |
| r5 = 86.04 | d5 = 3.30 | n3 = 1.80518 | v3 = 25.4 |
| r6 = −140.72 | d6 = Variable | | |
| r7 = 83.32 | d7 = 1.00 | n4 = 1.84666 | v4 = 23.8 |
| r8 = 27.06 | d8 = 4.75 | n5 = 1.48749 | v5 = 70.2 |
| r9 = −71.22 | d9 = 0.15 | | |
| r10 = 34.03 | d10 = 4.60 | n6 = 1.62004 | v6 = 36.3 |
| r11 = −61.56 | d11 = Variable | | |
| r12 = (Stop) | d12 = 2.64 | | |
| r13 = −85.68 | d13 = 1.20 | n7 = 1.88300 | v7 = 40.8 |
| r14 = 147.04 | d14 = 2.25 | | |
| r15 = −32.92 | d15 = 1.25 | n8 = 1.69680 | v8 = 55.5 |
| r16 = 28.98 | d16 = 4.40 | n9 = 1.84666 | v9 = 23.9 |
| r17 = −138.53 | d17 = 1.50 | | |
| r18 = Flare Stop | d18 = Variable | | |
| r19 = 30.09 | d19 = 5.54 | n10 = 1.48749 | v10 = 70.2 |
| r20 = 199.26 | d20 = 4.31 | n11 = 1.72916 | v11 = 54.7 |
| r21 = −30.70 | d21 = 1.20 | n12 = 1.84666 | v12 = 23.8 |
| r22 = −102.58 | d22 = 0.20 | | |
| r23 = 39.68 | d23 = 1.30 | n13 = 1.84666 | v13 = 23.8 |
| r24 = 25.52 | d24 = 1.85 | | |
| r25 = 47.27 | d25 = 6.84 | n14 = 1.55963 | v14 = 61.2 |
| r26 = −31.24 | d26 = 1.60 | n15 = 1.80518 | v15 = 25.4 |
| r27 = −53.13* | d27 = Variable | | |
| r28 = Flare Stop | | | |

*Aspheric Surface

| Variable Separations | Focal Length | | |
|---|---|---|---|
| | 17.50 | 27.34 | 34.09 |
| d2 | 16.05 | 16.05 | 16.05 |
| d6 | 20.00 | 5.50 | 1.11 |
| d11 | 0.55 | 4.55 | 7.11 |
| d18 | 6.18 | 2.18 | −0.38 |
| d27 | 0.00 | 11.21 | 18.85 |

| Aspheric Coefficients | Aspheric Surface | |
|---|---|---|
| | r1 | r27 |
| B | $8.069 \times 10^{-6}$ | $9.246 \times 10^{-6}$ |
| C | $-1.946 \times 10^{-9}$ | $1.463 \times 10^{-8}$ |
| D | $1.057 \times 10^{-11}$ | $-1.399 \times 10^{-10}$ |
| E | $-1.601 \times 10^{-14}$ | $1.900 \times 10^{-12}$ |
| F | $2.223 \times 10^{-17}$ | $-9.395 \times 10^{-15}$ |
| G | | $1.818 \times 10^{-17}$ |

EA = 27.6

Numerical Example 8:

f = 17.5–34.1   Fno. = 1:2.9   2ω = 102.1°–64.8°

| r1 = 57.03* | d1 = 2.00 | n1 = 1.77250 | v1 = 49.6 |
|---|---|---|---|
| r2 = 18.90 | d2 = Variable | | |
| r3 = −60.65 | d3 = 1.20 | n2 = 1.83481 | v2 = 42.7 |
| r4 = 69.54 | d4 = 2.00 | | |
| r5 = 83.54 | d5 = 3.30 | n3 = 1.80518 | v3 = 25.4 |
| r6 = −188.23 | d6 = Variable | | |
| r7 = 91.07 | d7 = 1.00 | n4 = 1.85026 | v4 = 32.3 |
| r8 = 26.43 | d8 = 4.75 | n5 = 1.48749 | v5 = 70.2 |
| r9 = −84.56 | d9 = 0.15 | | |
| r10 = 36.36 | d10 = 4.60 | n6 = 1.71999 | v6 = 50.3 |
| r11 = −71.73 | d11 = Variable | | |
| r12 = (Stop) | d12 = 2.24 | | |
| r13 = −103.49 | d13 = 1.20 | n7 = 1.88300 | v7 = 40.8 |
| r14 = 138.19 | d14 = 2.17 | | |
| r15 = −33.65 | d15 = 1.87 | n8 = 1.69680 | v8 = 55.5 |
| r16 = 28.55 | d16 = 4.40 | n9 = 1.84666 | v9 = 23.9 |
| r17 = −159.03 | d17 = 1.50 | | |
| r18 = Flare Stop | d18 = Variable | | |
| r19 = 29.54 | d19 = 5.47 | n10 = 1.48749 | v10 = 70.2 |
| r20 = −998.05 | d20 = 4.03 | n11 = 1.72916 | v11 = 54.7 |
| r21 = −32.35 | d21 = 1.20 | n12 = 1.84666 | v12 = 23.8 |
| r22 = −92.17 | d22 = 0.20 | | |
| r23 = 39.94 | d23 = 1.30 | n13 = 1.84666 | v13 = 23.8 |
| r24 = 25.60 | d24 = 1.85 | | |
| r25 = 47.52 | d25 = 6.96 | n14 = 1.55963 | v14 = 61.2 |
| r26 = −30.15 | d26 = 1.60 | n15 = 1.80518 | v15 = 25.4 |
| r27 = −52.78* | d27 = Variable | | |
| r28 = Flare Stop | | | |

*Aspheric Surface

| Variable Separations | Focal Length | | |
|---|---|---|---|
| | 17.50 | 27.40 | 34.10 |
| d2 | 15.89 | 15.89 | 15.89 |
| d6 | 20.11 | 5.50 | 1.10 |
| d11 | 0.76 | 5.26 | 8.01 |
| d18 | 6.66 | 2.16 | −0.59 |
| d27 | 0.00 | 10.66 | 17.92 |

| Aspheric Coefficients | Aspheric Surface | |
|---|---|---|
| | r1 | r27 |
| B | $7.497 \times 10^{-6}$ | $9.335 \times 10^{-6}$ |
| C | $-2.127 \times 10^{-9}$ | $1.659 \times 10^{-8}$ |
| D | $7.485 \times 10^{-12}$ | $-1.705 \times 10^{-10}$ |
| E | $-8.386 \times 10^{-15}$ | $2.298 \times 10^{-12}$ |
| F | $1.129 \times 10^{-17}$ | $-1.135 \times 10^{-14}$ |
| G | | $2.173 \times 10^{-17}$ |

EA = 27.7

Numerical Example 9:

f = 17.5–34.1   Fno. = 1:2.9   2ω = 102.1°–64.8°

| r1 = 59.22* | d1 = 2.00 | n1 = 1.77250 | v1 = 49.6 |
|---|---|---|---|
| r2 = 19.00 | d2 = Variable | | |
| r3 = −62.27 | d3 = 1.20 | n2 = 1.83481 | v2 = 42.7 |
| r4 = 66.83 | d4 = 2.00 | | |
| r5 = 81.74 | d5 = 3.30 | n3 = 1.80518 | v3 = 25.4 |
| r6 = −172.04 | d6 = Variable | | |
| r7 = 98.26 | d7 = 1.00 | n4 = 1.85026 | v4 = 32.8 |
| r8 = 26.43 | d8 = 4.75 | n5 = 1.48749 | v5 = 70.2 |
| r9 = −94.76 | d9 = 0.15 | | |
| r10 = 36.12 | d10 = 4.60 | n6 = 1.74400 | v6 = 44.8 |

-continued

Numerical Example 9:

f = 17.5–34.1   Fno. = 1:2.9   2ω = 102.1°–64.8°

| | | | |
|---|---|---|---|
| r11 = −76.58 | d11 = Variable | | |
| r12 = (Stop) | d12 = 2.44 | | |
| r13 = −97.94 | d13 = 1.20 | n7 = 1.88300 | ν7 = 40.8 |
| r14 = 144.70 | d14 = 2.09 | | |
| r15 = −35.82 | d15 = 1.33 | n8 = 1.69680 | ν8 = 55.5 |
| r16 = 33.49 | d16 = 4.40 | n9 = 1.84666 | ν9 = 23.9 |
| r17 = −150.67 | d17 = 1.50 | | |
| r18 = Flare Stop | d18 = Variable | | |
| r19 = 29.72 | d19 = 5.20 | n10 = 1.48749 | ν10 = 70.2 |
| r20 = 373.40 | d20 = 4.31 | n11 = 1.72916 | ν11 = 54.7 |
| r21 = −29.74 | d21 = 1.20 | n12 = 1.84666 | ν12 = 23.8 |
| r22 = −92.97 | d22 = 0.20 | | |
| r23 = 41.28 | d23 = 1.30 | n13 = 1.84666 | ν13 = 23.8 |
| r24 = 25.03 | d24 = 1.56 | | |
| r25 = 39.17 | d25 = 6.69 | n14 = 1.49700 | ν14 = 81.6 |
| r26 = −40.02 | d26 = 1.60 | n15 = 1.81474 | ν15 = 37.0 |
| r27 = −53.32* | d27 = Variable | | |
| r28 = Flare Stop | | | |

*Aspheric Surface

| Variable | Focal Length | | |
|---|---|---|---|
| Separations | 17.50 | 27.34 | 34.09 |
| d2 | 16.09 | 16.09 | 16.09 |
| d6 | 19.80 | 5.32 | 1.01 |
| d11 | 0.88 | 5.65 | 8.69 |
| d18 | 7.20 | 2.43 | −0.61 |
| d27 | 0.00 | 10.45 | 17.56 |

| Aspheric | Aspheric Surface | |
|---|---|---|
| Coefficients | r1 | r27 |
| B | 7.304 × 10⁻⁶ | 9.049 × 10⁻⁶ |
| C | −1.231 × 10⁻⁹ | 1.611 × 10⁻⁸ |
| D | 3.405 × 10⁻¹² | −1.880 × 10⁻¹⁰ |
| E | −1.508 × 10⁻¹⁵ | 2.424 × 10⁻¹² |
| F | 5.927 × 10⁻¹⁸ | −1.212 × 10⁻¹⁴ |
| G | | 2.344 × 10⁻¹⁷ |

EA = 27.7

Numerical Example 10:

f = 17.5–34.1   Fno. = 1:2.9   2ω = 102.1°–64.8°

| | | | |
|---|---|---|---|
| r1 = 58.95* | d1 = 2.00 | n1 = 1.77250 | ν1 = 49.6 |
| r2 = 18.64 | d2 = Variable | | |
| r3 = −58.99 | d3 = 1.20 | n2 = 1.83481 | ν2 = 42.7 |
| r4 = 84.59 | d4 = 2.00 | | |
| r5 = 109.08 | d5 = 3.10 | n3 = 1.80518 | ν3 = 25.4 |
| r6 = −155.22 | d6 = Variable | | |
| r7 = 101.19 | d7 = 1.00 | n4 = 1.85026 | ν4 = 32.3 |
| r8 = 26.60 | d8 = 4.55 | n5 = 1.48749 | ν5 = 70.2 |
| r9 = −80.20 | d9 = 0.15 | | |
| r10 = 35.15 | d10 = 4.35 | n6 = 1.74400 | ν6 = 44.8 |
| r11 = −80.26 | d11 = Variable | | |
| r12 = (Stop) | d12 = 2.31 | | |
| r13 = −89.55 | d13 = 1.20 | n7 = 1.88300 | ν7 = 40.8 |
| r14 = 141.71 | d14 = 2.07 | | |
| r15 = −35.02 | d15 = 1.09 | n8 = 1.69680 | ν8 = 55.5 |
| r16 = 30.49 | d16 = 4.00 | n9 = 1.84666 | ν9 = 23.9 |
| r17 = −157.74 | d17 = 1.50 | | |
| r18 = Flare Stop | d18 = Variable | | |
| r19 = 29.15 | d19 = 4.69 | n10 = 1.48749 | ν10 = 70.2 |
| r20 = 361.38 | d20 = 4.75 | n11 = 1.72916 | ν11 = 54.7 |
| r21 = −29.41 | d21 = 1.20 | n12 = 1.84666 | ν12 = 23.8 |
| r22 = −86.75 | d22 = 0.20 | | |
| r23 = 43.48 | d23 = 1.30 | n13 = 1.84666 | ν13 = 23.8 |
| r24 = 25.52 | d24 = 1.38 | | |
| r25 = 37.67 | d25 = 6.92 | n14 = 1.49700 | ν14 = 81.6 |
| r26 = −37.40 | d26 = 1.60 | n15 = 1.81474 | ν15 = 37.0 |
| r27 = −51.716* | d27 = Variable | | |
| r28 = Flare Stop | | | |

*Aspheric Surface

| Variable | Focal Length | | |
|---|---|---|---|
| Separations | 17.50 | 27.45 | 34.08 |
| d2 | 15.13 | 15.13 | 15.13 |
| d6 | 18.82 | 5.15 | 1.10 |
| d11 | 0.84 | 5.69 | 8.46 |
| d18 | 7.63 | 2.77 | 0.00 |
| d27 | 0.00 | 10.51 | 17.66 |

| Aspheric | Aspheric Surface | |
|---|---|---|
| Coefficients | r1 | r27 |
| B | 8.292 × 10⁻⁶ | 1.019 × 10⁻⁵ |
| C | −2.909 × 10⁻⁹ | 1.828 × 10⁻⁸ |
| D | 6.879 × 10⁻¹² | −1.763 × 10⁻¹⁰ |
| E | −4.299 × 10⁻¹⁵ | 2.251 × 10⁻¹² |
| F | 8.092 × 10⁻¹⁸ | −1.051 × 10⁻¹⁴ |
| G | | 1.909 × 10⁻¹⁷ |

EA = 27.6

Numerical Example 11:

f = 17.5–34.1   Fno. = 1:2.9   2ω = 102.1°–64.8°

| | | | |
|---|---|---|---|
| r1 = 67.25* | d1 = 2.00 | n1 = 1.77250 | ν1 = 49.6 |
| r2 = 19.12 | d2 = Variable | | |
| r3 = −55.16 | d3 = 1.20 | n2 = 1.83481 | ν2 = 42.7 |
| r4 = 114.52 | d4 = 1.70 | | |
| r5 = 168.53 | d5 = 3.00 | n3 = 1.80518 | ν3 = 25.4 |
| r6 = −113.04 | d6 = Variable | | |
| r7 = 111.84 | d7 = 1.00 | n4 = 1.85026 | ν4 = 32.3 |
| r8 = 26.55 | d8 = 4.50 | n5 = 1.48749 | ν5 = 70.2 |
| r9 = −85.81 | d9 = 0.15 | | |
| r10 = 36.27 | d10 = 4.35 | n6 = 1.74400 | ν6 = 44.8 |
| r11 = −73.04 | d11 = Variable | | |
| r12 = (Stop) | d12 = 2.41 | | |
| r13 = −80.87 | d13 = 1.20 | n7 = 1.88300 | ν7 = 40.8 |
| r14 = 172.47 | d14 = 2.13 | | |
| r15 = −35.00 | d15 = 2.10 | n8 = 1.69680 | ν8 = 55.5 |
| r16 = 29.90 | d16 = 4.20 | n9 = 1.84666 | ν9 = 23.9 |
| r17 = −142.60 | d17 = 1.50 | | |
| r18 = Flare Stop | d18 = Variable | | |
| r19 = 28.75 | d19 = 4.76 | n10 = 1.49700 | ν10 = 81.6 |
| r20 = 127.85 | d20 = 5.62 | n11 = 1.71300 | ν11 = 53.8 |
| r21 = −29.07 | d21 = 1.20 | n12 = 1.84666 | ν12 = 23.8 |
| r22 = −86.56 | d22 = 0.20 | | |
| r23 = 42.85 | d23 = 1.30 | n13 = 1.84666 | ν13 = 23.8 |
| r24 = 24.58 | d24 = 1.32 | | |
| r25 = 34.67 | d25 = 7.45 | n14 = 1.48749 | ν14 = 70.2 |
| r26 = −32.09 | d26 = 1.60 | n15 = 1.83400 | ν15 = 37.2 |
| r27 = −51.54* | d27 = Variable | | |
| r28 = Flare Stop | | | |

*Aspheric Surface

| Variable | Focal Length | | |
|---|---|---|---|
| Separations | 17.50 | 27.54 | 34.10 |
| d2 | 15.74 | 15.74 | 15.74 |
| d6 | 19.15 | 5.23 | 1.12 |
| d11 | 0.80 | 5.96 | 8.75 |
| d18 | 7.83 | 2.66 | −0.13 |
| d27 | 0.00 | 10.70 | 17.98 |

| Aspheric | Aspheric Surface | |
|---|---|---|
| Coefficients | r1 | r27 |
| B | $8.373 \times 10^{-6}$ | $9.765 \times 10^{-6}$ |
| C | $-4.109 \times 10^{-9}$ | $1.654 \times 10^{-8}$ |
| D | $7.289 \times 10^{-12}$ | $-1.272 \times 10^{-10}$ |
| E | $-4.049 \times 10^{-15}$ | $1.632 \times 10^{-12}$ |
| F | $5.018 \times 10^{-18}$ | $-7.311 \times 10^{-15}$ |
| G |  | $1.347 \times 10^{-17}$ |

EA = 27.5

TABLE 2

| Factor | Lower Limit | Upper Limit | Numerical Example | | | | | | | | |
|---|---|---|---|---|---|---|---|---|---|---|---|
|  |  |  | 3 | 4 | 5 | 6 | 7 | 8 | 9 | 10 | 11 |
| TLW/fW | 6 | 10 | 7.36 | 7.372 | 7.399 | 7.692 | 7.902 | 7.910 | 7.898 | 7.716 | 7.911 |
| M1/M2 | −0.3 | 0.3 | −0.0014 | −0.034 | −0.013 | −0.042 | −0.0028 | −0.061 | −0.070 | −0.0028 | −0.0027 |
| IX − $X_0$I/EA | 0.005 | 0.05 | 0.0151 | 0.0128 | 0.0126 | 0.0145 | 0.0162 | 0.0168 | 0.0160 | 0.0182 | 0.0172 |
| f4/fW | 1.5 | 3 | 1.997 | 2.063 | 1.905 | 2.085 | 2.136 | 2.153 | 2.143 | 2.078 | 2.133 |
| f4/fT | 0.7 | 1.8 | 1.086 | 1.123 | 1.038 | 1.071 | 1.096 | 1.105 | 1.100 | 1.067 | 1.095 |
| LSP/TLW | 0.37 | 0.47 | 0.43 | 0.429 | 0.43 | 0.421 | 0.421 | 0.419 | 0.421 | 0.411 | 0.405 |
| M3/M2 | 0.4 | 0.7 | 0.555 | 0.511 | 0.625 | 0.643 | 0.652 | 0.595 | 0.556 | 0.568 | 0.558 |
| N21 | 1.7 | — | 1.8467 | 1.8467 | 1.8467 | 1.8467 | 1.8467 | 1.8503 | 1.8503 | 1.8503 | 1.8503 |
| ν21 | 30 | — | 23.8 | 23.8 | 23.8 | 23.8 | 23.8 | 32.3 | 32.3 | 32.3 | 32.3 |
| N432 | 1.7 | — | 1.8052 | 1.8052 | 1.8052 | 1.8052 | 1.8052 | 1.8052 | 1.8147 | 1.8147 | 1.834 |
| ν432 | 30 | — | 25.4 | 25.4 | 25.4 | 25.4 | 25.4 | 25.4 | 37 | 37 | 37.2 |

According to the invention as applied to the negative lead type zoom lens comprising four lens units in total, the proper rules of design are set forth for the refractive powers of all the lens units and for the form and the construction and arrangement of the constituent lenses, thereby making it possible to achieve a zoom lens whose total angular field coverage for the wide-angle end is increased to 100° with the back focal distance kept at a predetermined value and which has a zoom ratio of 2 and an F-number of 2.9 or thereabout and maintains good stability of optical performance at a high grade over the entire zooming range.

What is claimed is:

1. A zoom lens, comprising, from front to rear, a first lens unit of negative refractive power, a second lens unit of positive refractive power, a third lens unit of negative refractive power, and a fourth lens unit of positive refractive power, wherein zooming is effected by changing spaces between said lens units, and said first lens unit has, from front to rear, a negative lens, a negative lens, and a positive lens, and at least one non-spherical lens surface which shows a positive refractive power increasing from center to periphery, and said fourth lens unit has at least one non-spherical lens surface which shows a positive refractive power decreasing from center to periphery, and which satisfies the following conditions:

D1T<D1W

D2W<D2T

D3T<D3W, wherein for said first to fourth lens units, DiW denotes the axial air separation for the wide-angle end between the i-th and the (i+1)st lens units, and DiT denotes the axial air separation for the telephoto end between the i-th and the (i+1)st lens unit.

2. A zoom lens, comprising, from front to rear, a first lens unit of negative refractive power, a second lens unit of positive refractive power, a third lens unit of negative refractive power, and a fourth lens unit of positive refractive power, wherein zooming is effected by changing spaces between said lens units, and said fourth lens unit has a positive sub-lens unit, a second sub-lens unit of a meniscus lens having a strong negative refractive power on the image side, and a third positive sub-lens unit and has at least one non-spherical lens surface which shows a positive refractive power decreasing from center to periphery, and which satisfies the following conditions:

D1T<D1W

D2W<D2T

D3T<D3W, wherein for said first to fourth lens units, DiW denotes the axial air separation for the wide-angle end between the i-th and the (i+1)st lens units, and DiT denotes the axial air separation for the telephoto end between the i-th and the (i+1)st lens unit.

3. A zoom lens according to claim 1 or 2, satisfying the following conditions:

6<TLW/fW<10

0.37<LSP/TLW<0.47

1.5<f4/fW<3

0.7<f4/fT<1.8, wherein LSP is the axial length for the wide-angle end from the frontmost lens surface of said first lens unit to the frontmost lens surface of said third lens unit, TLW is the optical total length for the wide-angle end, fW is the shortest focal length of the entire system, fT is the longest focal length of the entire system, and f4 is the focal length of said fourth lens unit.

4. A zoom lens according to claim 1 or 2, satisfying the following conditions:

−0.3<M1/M2<0.3

$0.4 < M3/M2 < 0.7$, wherein M1, M2, and M3 are the movements of said first, second, and third lens units, respectively, with zooming from a wide-angle end to a telephoto end.

5. A zoom lens according to claim 1 or 2, wherein the non-spherical surface of said fourth lens unit satisfies the following conditions:

$0.005 < |X - X_0|/EA < 0.05$, wherein X is the axial distance from the vertex of the non-spherical surface to the position for a ray effective diameter, $X_0$ is the axial distance from the vertex of the non-spherical surface to the position for a ray effective diameter determined by a sphere as derived from the curvature of only the paraxial zone of the non-spherical surface, and EA is the ray effective diameter of the non-spherical surface.

6. A zoom lens according to claim 2, wherein said second lens unit comprises, from front to rear, a negative first lens of meniscus form concave toward the image side, a positive second lens, and a positive third lens, and wherein said third lens sub-unit has a cemented lens of a positive lens and a negative lens of meniscus form concave toward the object side cemented together, said zoom lens satisfying the following conditions:

$1.7 < N21$ $30 < \nu21$ $1.7 < N432$ $30 < \nu432$, wherein N21 and ν21 denote the refractive index and Abbe number, respectively, of the material of said first lens of said second lens unit, and wherein N432 and ν432 denote the refractive index and Abbe number, respectively, of the material of said negative lens of meniscus form in said third lens sub-unit.

* * * * *

UNITED STATES PATENT AND TRADEMARK OFFICE
CERTIFICATE OF CORRECTION

PATENT NO. : 5,710,669
DATED : January 20, 1998
INVENTOR(S) : HIROSHI ENDO

It is certified that error appears in the above-identified patent and that said Letters Patent is hereby corrected as shown below:

COLUMN 2

Line 40, "(8)" should read --(B)--.

COLUMN 3

Line 58, "hi-convex" should read --bi-convex--.
    Line 62, "hi-convex" should read --bi-convex--.

COLUMN 12

Line 14, "word," should read --words,--.

UNITED STATES PATENT AND TRADEMARK OFFICE
CERTIFICATE OF CORRECTION

PATENT NO. : 5,710,669
DATED : January 20, 1998
INVENTOR(S) : HIROSHI ENDO

It is certified that error appears in the above-identified patent and that said Letters Patent is hereby corrected as shown below:

COLUMN 13

Line 15, "well correct" should read --correct well--.

Signed and Sealed this

First Day of December, 1998

Attest:

BRUCE LEHMAN

Attesting Officer     Commissioner of Patents and Trademarks